(12) United States Patent
Parikh et al.

(10) Patent No.: US 12,668,281 B1
(45) Date of Patent: Jun. 30, 2026

(54) DATABASE GENERATION INCLUDING PREDICTED SCENARIOS

(71) Applicant: Zoox, Inc., Foster City, CA (US)

(72) Inventors: Samir Parikh, Los Gatos, CA (US); Gopi Krishna Tummala, Fremont, CA (US)

(73) Assignee: Zoox, Inc., Foster City, CA (US)

( * ) Notice: Subject to any disclaimer, the term of this patent is extended or adjusted under 35 U.S.C. 154(b) by 353 days.

(21) Appl. No.: 18/375,255

(22) Filed: Sep. 29, 2023

(51) Int. Cl.
*B60W 60/00* (2020.01)
*B60W 40/06* (2012.01)

(52) U.S. Cl.
CPC ........ *B60W 60/0027* (2020.02); *B60W 40/06* (2013.01); *B60W 60/0011* (2020.02); *B60W 60/00184* (2020.02); *B60W 2552/05* (2020.02); *B60W 2552/10* (2020.02)

(58) Field of Classification Search
CPC ......... B60W 60/0027; B60W 60/0011; B60W 60/00184; B60W 40/06; B60W 2552/05; B60W 2552/10
See application file for complete search history.

(56) References Cited

U.S. PATENT DOCUMENTS

| | | | |
|---|---|---|---|
| 10,649,459 B2 | 5/2020 | Wang et al. | |
| 11,163,990 B2 | 11/2021 | Goel | |
| 11,169,531 B2 | 11/2021 | Hong et al. | |
| 11,520,037 B2 | 12/2022 | Bongio Karrman et al. | |
| 11,625,041 B2 | 4/2023 | Das et al. | |
| 11,814,046 B2 * | 11/2023 | Seccamonte | ........ B60W 50/082 |

| | | | |
|---|---|---|---|
| 12,481,806 B2 | 11/2025 | Govardhanam | |
| 2020/0082248 A1 | 3/2020 | Villegas et al. | |
| 2020/0258380 A1 * | 8/2020 | Wissing | ................... G08G 1/04 |
| 2021/0097722 A1 | 4/2021 | Mammou et al. | |
| 2021/0181758 A1 | 6/2021 | Das et al. | |

(Continued)

FOREIGN PATENT DOCUMENTS

| | | | | |
|---|---|---|---|---|
| JP | 2012047508 A | * | 3/2012 | |
| KR | 20210100377 A | * | 8/2021 | ............. G05D 1/644 |

OTHER PUBLICATIONS

Kobilarov, et al., U.S. Appl. No. 17/854,269, filed Jun. 30, 2022, titled "Identifying Relevant Objects Within an Environment", 20 pages.

(Continued)

*Primary Examiner* — Justin S Lee
(74) *Attorney, Agent, or Firm* — Lee & Hayes, P.C.

(57) ABSTRACT

Techniques for generating a database containing predicted driving scenarios are discussed herein. A database management component may receive sensor data captured by sensors of vehicle(s) (e.g., driving log data) based on previous driving trips within various physical driving environments. The database management component may cluster driving scenarios observed from the sensor data based on the driving scenario's feature similarity. In some examples, the database management component may determine prediction information (e.g., actual trajectory from log data or trajectory generated by machine-learning model) to associate with each cluster. Accordingly, each cluster may include an encoded representation (e.g., key) as well as corresponding prediction information (e.g., value). In some examples, the database management component may store some or all key-value pairs in a database accessible by one or more vehicles while such vehicles navigate an environment.

20 Claims, 9 Drawing Sheets

(56)  References Cited

U.S. PATENT DOCUMENTS

| | | | |
|---|---|---|---|
| 2021/0192196 A1 | 6/2021 | Bagwell et al. | |
| 2021/0200212 A1* | 7/2021 | Urtasun | G05D 1/0214 |
| 2021/0201265 A1* | 7/2021 | Galliano, III | G01C 21/3697 |
| 2022/0156605 A1* | 5/2022 | Choe | B60W 60/0011 |
| 2022/0292955 A1* | 9/2022 | Takasaki | G08G 1/096775 |
| 2022/0355825 A1 | 11/2022 | Deo et al. | |
| 2023/0031829 A1 | 2/2023 | Ma et al. | |
| 2023/0045727 A1* | 2/2023 | Wang | G06Q 50/10 |
| 2023/0059808 A1 | 2/2023 | Purdy | |
| 2023/0131815 A1 | 4/2023 | Becattini et al. | |
| 2023/0406360 A1 | 12/2023 | Al-Rfou et al. | |
| 2024/0001926 A1* | 1/2024 | Singh | B60W 30/16 |
| 2024/0166236 A1* | 5/2024 | Iyra | G06F 30/20 |
| 2024/0192001 A1* | 6/2024 | Grimm | G01C 21/3453 |
| 2024/0400096 A1* | 12/2024 | Gallagher | B60W 60/0011 |
| 2025/0145179 A1 | 5/2025 | Knittel | |

OTHER PUBLICATIONS

Schleede, et al. U.S. Appl. No. 18/071,489, filed Nov. 29, 2022, titled "Vehicle Control Using Auto-Regressive Control Distibution Generation Based on World State Embeddings", 63 pages.

Ethan Miller Pronovost, U.S. Appl. No. 18/087,570, filed Dec. 22, 2022, titled "Generating Object Representations Using a Variable Autoencoder", 56 pages.

Parikh, et al., U.S. Appl. No. 18/132,289, filed Apr. 7, 2023, titled "Machine-Learned Model for Detecting Object Relevance to Vehicle Operation Planning", 48 pages.

Office Action for U.S. Appl. No. 18/375,344, Dated Jul. 31, 2025, Parikh, Predicted Trajectory Determination Based on Precomputed Predicted Scenarios, 22 pages.

Office Action for U.S. Appl. No. 18/375,344, Dated Dec. 11, 2025, 19 Pages.

* cited by examiner

300

500

RECEIVE, USING A KEY, A PREDICTED TRAJECTORY FROM A FIRST DATABASE
502

PREDICT FUTURE KEYS
514

STORE, IN A SECOND DATABASE, PREDICTED TRAJECTORIES ASSOCIATED WITH FUTURE KEYS
524

RETRIEVE, BASED ON THE PREDICTED KEYS, THE PREDICTED TRAJECTORIES FROM THE SECOND DATABASE
534

FIRST DATABASE 528     <M2,S4> <ROLLOUT1> 530     SECOND DATABASE 532

800 ⤵

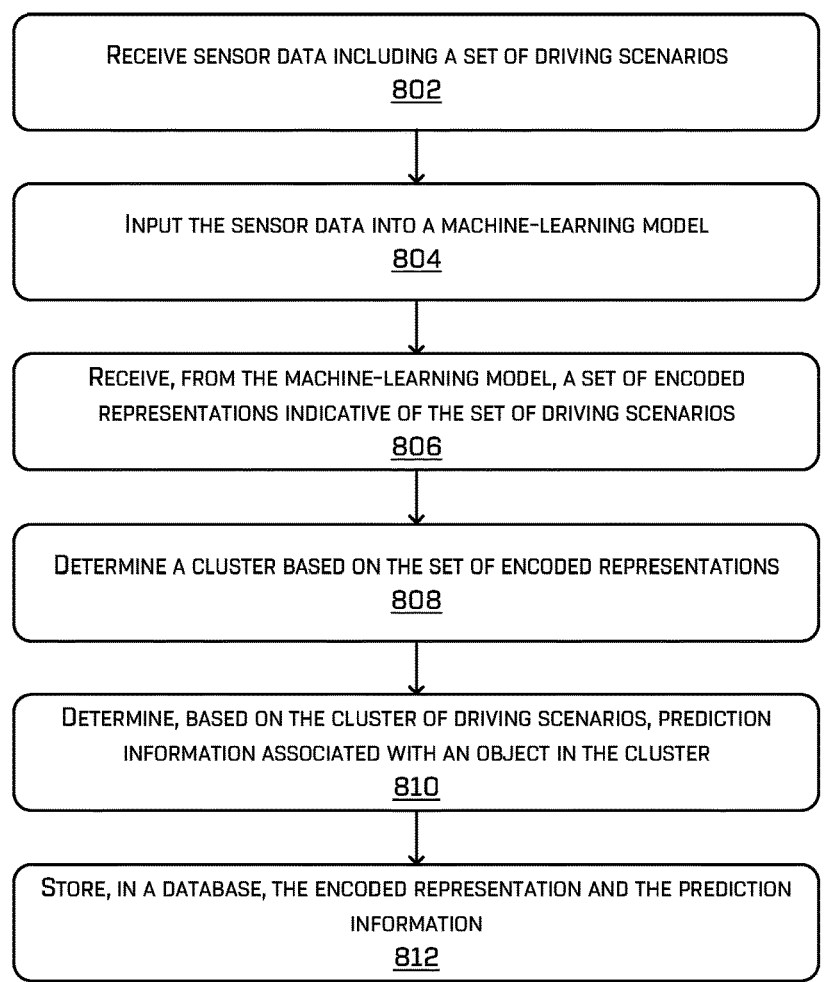

RECEIVE SENSOR DATA INCLUDING A SET OF DRIVING SCENARIOS
802

INPUT THE SENSOR DATA INTO A MACHINE-LEARNING MODEL
804

RECEIVE, FROM THE MACHINE-LEARNING MODEL, A SET OF ENCODED
REPRESENTATIONS INDICATIVE OF THE SET OF DRIVING SCENARIOS
806

DETERMINE A CLUSTER BASED ON THE SET OF ENCODED REPRESENTATIONS
808

DETERMINE, BASED ON THE CLUSTER OF DRIVING SCENARIOS, PREDICTION
INFORMATION ASSOCIATED WITH AN OBJECT IN THE CLUSTER
810

STORE, IN A DATABASE, THE ENCODED REPRESENTATION AND THE PREDICTION
INFORMATION
812

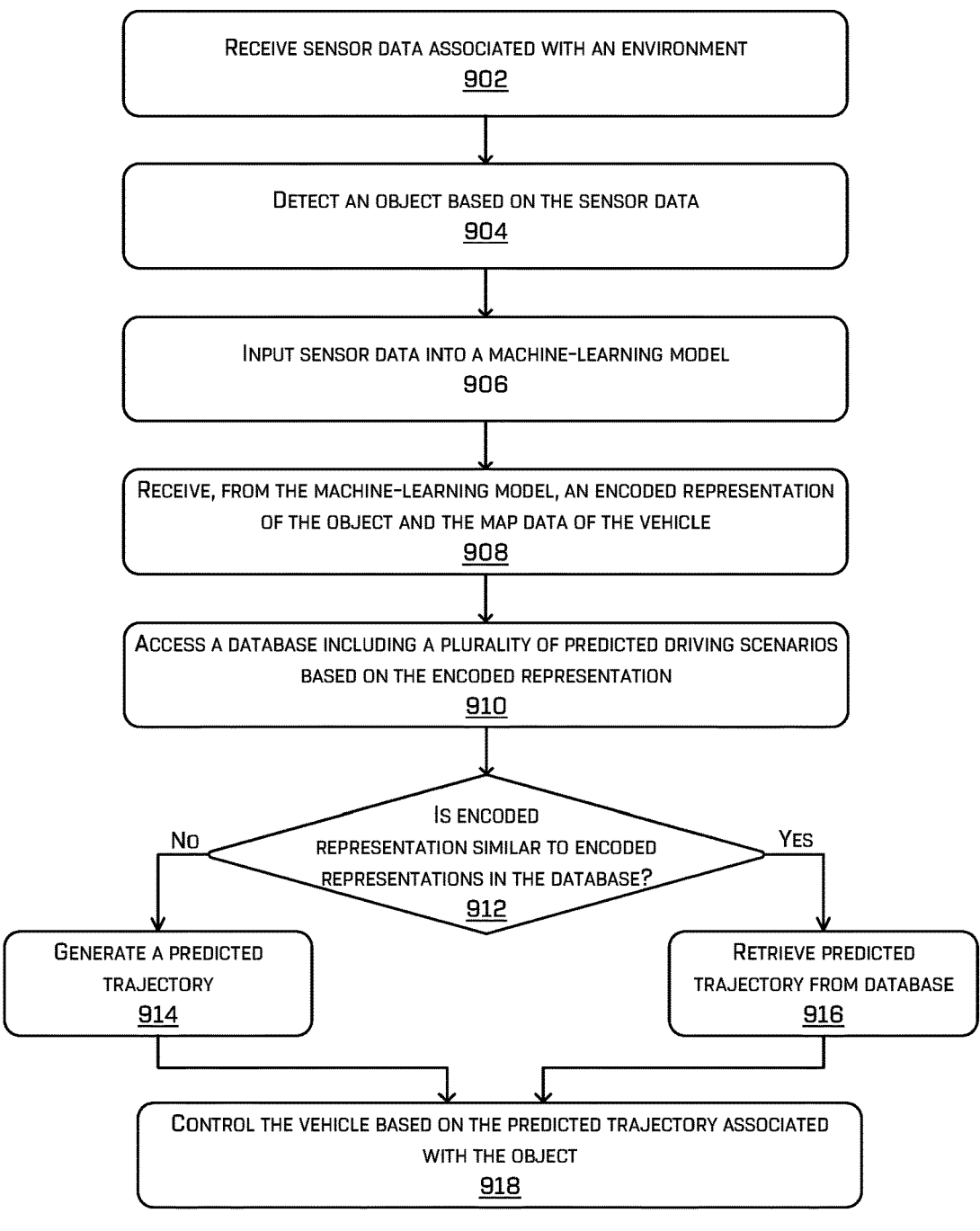

RECEIVE SENSOR DATA ASSOCIATED WITH AN ENVIRONMENT
902

DETECT AN OBJECT BASED ON THE SENSOR DATA
904

INPUT SENSOR DATA INTO A MACHINE-LEARNING MODEL
906

RECEIVE, FROM THE MACHINE-LEARNING MODEL, AN ENCODED REPRESENTATION
OF THE OBJECT AND THE MAP DATA OF THE VEHICLE
908

ACCESS A DATABASE INCLUDING A PLURALITY OF PREDICTED DRIVING SCENARIOS
BASED ON THE ENCODED REPRESENTATION
910

IS ENCODED
REPRESENTATION SIMILAR TO ENCODED
REPRESENTATIONS IN THE DATABASE?
912

NO                                              YES

GENERATE A PREDICTED
TRAJECTORY
914

RETRIEVE PREDICTED
TRAJECTORY FROM DATABASE
916

CONTROL THE VEHICLE BASED ON THE PREDICTED TRAJECTORY ASSOCIATED
WITH THE OBJECT
918

FIG. 9

DATABASE GENERATION INCLUDING PREDICTED SCENARIOS

BACKGROUND

Autonomous vehicles may navigate along designated routes or between waypoints. In some situations, autonomous vehicles may encounter various types of static and/or dynamic objects within an environment. In some circumstances, the autonomous vehicle may use sensor devices to detect and/or classify these objects. Upon detecting such objects, the autonomous vehicle may determine a trajectory to follow through the environment based on predicted actions of the objects. That is, the autonomous vehicle may generate predicted trajectories for the detected objects and evaluate such predicted trajectories when determining a trajectory for the vehicle to follow. However, in many cases, techniques for generating predicted trajectories to associate with objects in an environment can result in excessive computations and/or delayed results. Such delay may result in unsafe behavior of the vehicle.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 is a flow diagram illustrating an example process of receiving sensor data, determining a subset of similar driving scenarios, and storing the similar driving scenarios in a database, in accordance with one or more examples of the disclosure.

FIG. 9 is a flow diagram illustrating an example process of receiving sensor data, determining encoded data based on the sensor data, determining predicted trajectories based on the encoded data, and controlling the vehicle to follow the predicted trajectory, in accordance with one or more examples of the disclosure.

DETAILED DESCRIPTION

Figure 1:
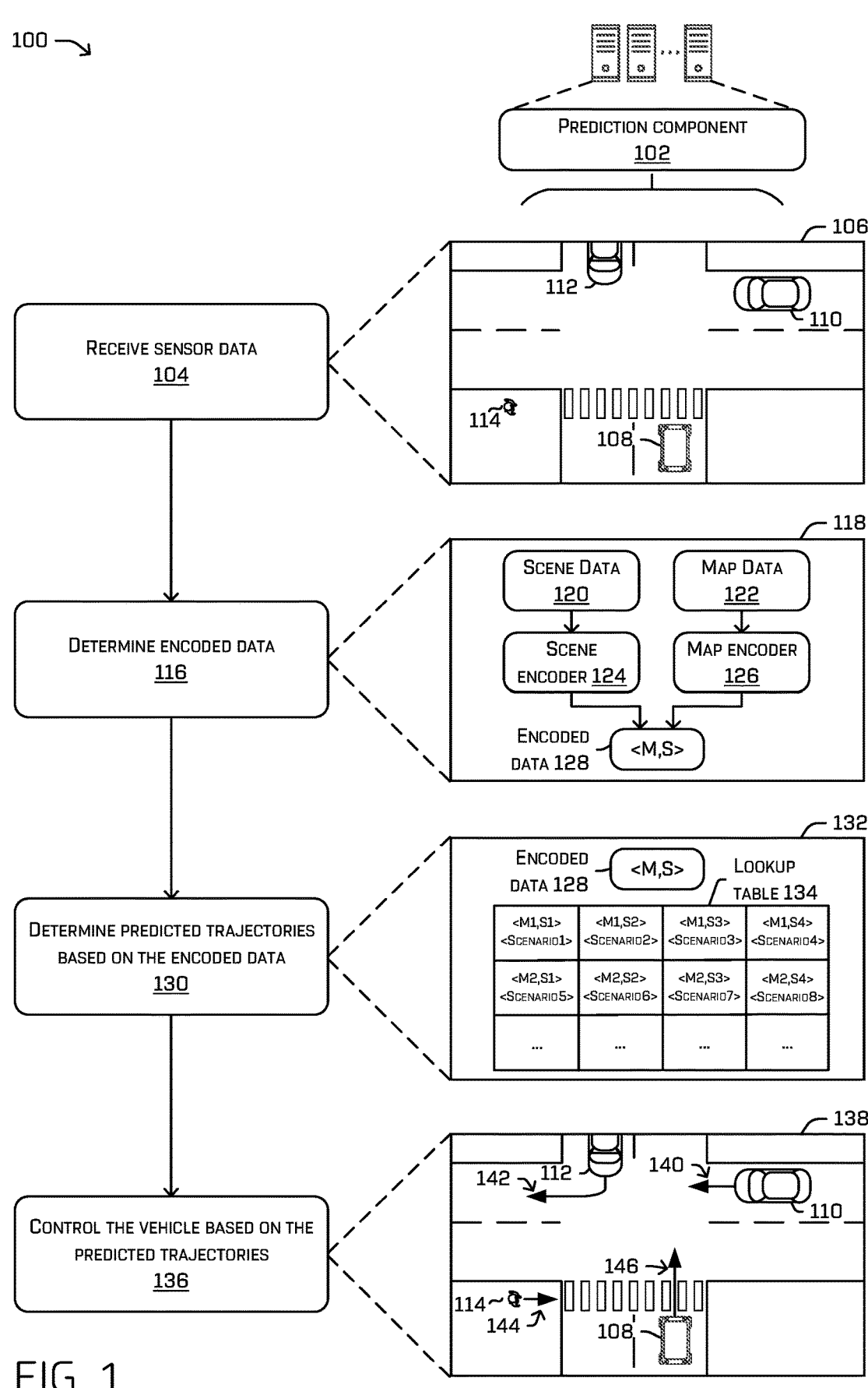
FIG. 1 is a pictorial flow diagram illustrating an example technique for receiving sensor data, encoding the sensor data, determining a predicted trajectory based on the encoded sensor data, and controlling the vehicle based on the predicted trajectory, in accordance with one or more examples of the disclosure.

As discussed above, techniques for predicting object trajectories can result in excessive computations and/or delayed results which, in some scenarios, may result in unsafe behavior of a vehicle relying on such predictions.

Techniques for receiving and/or determining a predicted trajectory of an object in an environment are discussed herein. In some instances, a database containing driving scenarios may be pre-computed (e.g., based on observations, models, or otherwise) to enable a vehicle to receive predicted trajectories for objects the vehicle encounters while navigating the environment. In some examples, a database management component may determine, receive, or otherwise generate a database containing driving scenarios. For example, the database management component may receive sensor data captured by sensors of one or more vehicles (e.g., driving log data) based on previous driving trips within various physical (or real-world) driving environments. The database management component may analyze the sensor data and cluster driving scenarios based on the driving scenario's feature similarity (e.g., similar road geometry, lane markers, type of object(s), number of objects, location of object(s), similarity of an encoding (such as an embedding) which representative of the scenario, etc.). For instance, the database management component may determine an encoded representation (e.g., key; <M,S>) based on the map data (e.g., <M>, which may comprise, for example, road geometry, lane markers, topography, etc.) and/or the scene data (e.g., <S> which may comprise, for example, number of object(s), location of object(s), type of object(s), pose of object(s), kinematic information of object(s), etc.) corresponding to a specific driving scenario. Of course, the disclosure is not meant to be so limiting and a single encoding of a scenario representative of objects in an environment may be used to map to the predicted environment. The database management component may cluster driving scenarios based on evaluating and/or comparing the encoded representations of the various driving scenarios (e.g., using k-means, DBSCAN, or otherwise). Based on clustering the driving scenarios, the database management component may determine and/or associate prediction information to associate with each cluster. Such prediction information may include actual trajectories observed from the log data or trajectories generated by machine-learning model(s) for some or all objects in the driving scenario, a representation of the environment at a subsequent time step (e.g., from log data or as may be output from a model), or otherwise. As such, each cluster may include a single encoded representation (e.g., key) as well as corresponding prediction information (e.g., value; the predicted trajectories for the objects in the driving scenario). In some examples, the database management component may store some or all key-value pairs in a database accessible by one or more vehicles while such vehicles navigate an environment.

In some examples, a vehicle (such as an autonomous vehicle) may receive sensor data representative of an environment. The vehicle may analyze such sensor data to detect and/or classify object(s) proximate the vehicle. In such instances, the vehicle may determine whether to retrieve predicted trajectories from the precomputed database, or generate predicted trajectories (on-vehicle) to associate with the various objects. To make this a determination, the vehicle may determine whether the database includes an encoded representation sufficiently similar to an encoded representation of the current sensor data captured by the vehicle. For example, the vehicle may determine an encoded representation based on the map data, scene data, and/or location data of the vehicle. Upon encoding the current sensor data, the vehicle may determine whether the database includes an encoded representation that is sufficiently similar to the encoded representation of the current sensor data. If the vehicle identifies or otherwise determines that the database includes an encoded representation that is similar to the encoded representation of the current sensor data (e.g., within a threshold distance when represented as an embedding, having less than a threshold difference in any one or more components of the representation, etc.), the vehicle may retrieve or otherwise receive the prediction information (e.g., value) corresponding to the encoded representation stored in the database. Conversely, if the vehicle determines that the database does not include a sufficiently similar encoded representation, the vehicle may generate predicted trajectories for the detected object(s) using additional computational resources including machine learned models or otherwise. Examples of such predictions may comprise, for example, those prediction models described in U.S. Pat. No. 11,169,531 entitled "Trajectory Prediction on Top-Down Scenes," issued on Nov. 9, 2021, the entire contents of which are hereby incorporated by reference herein. In any example herein, a predicted trajectory for the object may be further refined based at least in part on an extrapolation or interpolation of values available in the database. In still further examples, predictions based on the database may be for those objects detected in the scene determined to have a lower relevancy score, such as those described in U.S. patent Ser. No. 17/854,269 entitled "Identifying Relevant Objects Within an Environment," filed on Jun. 30, 2022, the entire contents of which are hereby incorporated by reference herein. As a non-limiting example of which, objects having lower relevance may have predicted behaviors determined based on the database whereas highly relevant objects may have more computational resources dedicated thereto.

In some examples, the vehicle may send the predicted trajectories (e.g., obtained from the database or generated on-vehicle) to a planning component of the vehicle which may evaluate such predicted trajectories to determine a trajectory for the vehicle to follow through the environment. As described in more detail below, the techniques may improve vehicle safety and driving efficiency by determining and/or using a database of predicted trajectories to efficiently allow a vehicle to query the database for predicted trajectories while navigating the environment, thereby enabling the computing systems of the vehicle (e.g., database management component, prediction component, etc.) to perform safer and more efficient driving maneuvers.

When determining predicted trajectories for objects proximate a vehicle, conventional systems and/or techniques may be computationally expensive, inefficient, and/or result in processing delays (e.g., latency). For example, while traversing an environment, a vehicle can detect and/or classify multiple objects within a region of the environment proximate the vehicle. In such examples, the vehicle may determine a trajectory to follow through the environment based on the predicted actions of the objects. To determine predicted action(s) of the object(s), the vehicle may generate one or more different predicted trajectories representing likely actions the object(s) may perform at a future time. However, as vehicles navigate in highly populated environments and/or utilize long range sensor devices, such vehicles may detect large volumes of objects. In such instances, generating multiple predicted trajectories for such a large volume of objects may be computationally expensive and may result in increased latency between one or more prediction and/or planning components. Specifically, the amount of time between detecting the objects and generating the predicted candidate trajectories may cause significant latency in the computing systems, limiting the available bandwidth for downstream components (e.g., prediction and/or planner components). Consequently, the limitations to the conventional techniques may result in generating large amounts of predicted trajectories, thereby resulting in processing delays between vehicle components.

To address these and other technical problems and inefficiencies, the systems and/or techniques described herein include a database management system (which also may be referred to as a "database management component" or a "database manager") configured to generate a database containing predicted trajectories and/or a prediction component configured to receive such predicted trajectories. The database management component may determine or otherwise generate a database of predicted driving scenarios which may be leveraged to enable a vehicle to receive such predicted scenarios while navigating an environment. Technical solutions discussed herein solve one or more technical problems associated with conventional predicted trajectory generating techniques resulting in processing delays and/or excessive amounts of required computational resources.

Initially, a database management component may receive sensor data captured at a previous time. In some examples, the database management component may receive and/or determine a database during a pre-computation stage. For example, a pre-computation state may be a moment in which the vehicle turns on, initializes, and/or any other situation. In some instances, the database management component may receive, as driving log data for example, data of one or more autonomous vehicles including, for example, sensor data, output of one or more components including prediction components, planning components, actuators, etc, which may be based on previous driving trips within various physical driving environments. Additionally or alternatively, data associated with driving environments may be received from other sources, such as driving simulations and/or non-vehicle based environmental sensors. In some examples, the data may include one or more driving scenarios captured and/or experienced by a vehicle at a previous time. A driving scenario may include the associated map data, vehicle information (e.g., trajectory data (e.g., velocity, acceleration steering angle, etc.), pose data, etc.), object information (e.g., a trajectory of the object(s), a pose of the object(s), a number of object(s), a type of the object(s), a past trajectory of the object(s), etc.) and/or any other information.

In some examples, the database management component may determine or otherwise identify a driving scenario that is sufficiently similar to one or more other driving scenarios. That is, the database management component may determine a cluster (e.g., subset) of driving scenarios that have similar map and scene features. Such features may include road geometry (e.g., T-intersection, three-way stop, straight road, curved road, etc.), a number of lanes, a type of lane marker (e.g., color of lane (e.g., yellow, white, etc.), dashed lane, solid single lane, solid double lane, etc.), a speed limit, a number of objects, a type of object (e.g., static, dynamic (e.g., vehicle (e.g., small car, semi-truck, etc.), pedestrian, animal, etc.), a feature of the object (e.g., a pose, a trajectory, a velocity, an acceleration, etc.), environmental data (e.g., time of day, visibility, amount of sunlight, weather conditions (e.g., rain, snow, ice), etc.) of the environment, and/or any other features. In some examples, the database management component may determine whether driving scenarios are similar based on various techniques, such as by using a heuristic-based approach (e.g., cluster driving scenarios together that have similar or identical tags (e.g., provided by human and/or machine-learned taggers at a previous time)), inputting the sensor data into an machine-learning model trained to output clusters of similar driving scenarios, encoding feature vectors based on the sensor data and determining whether a distance between feature vectors of different driving scenarios are within a threshold distance, and/or any other clustering technique. For example, the database management component may determine a cluster of driving scenarios that include some or all driving scenarios having a T-intersection road, a speed limit of 35 mph, two lanes of traffic in all four directions, and/or objects (e.g., a similar or identical type) located at similar or identical locations relative to the vehicle. However, this example is not intended to be limiting; in other examples, the database management component may cluster the driving scenarios based on a variety of different criteria.

Techniques for generating an encoded representation of the sensor data and/or feature vector representation of such sensor data may be found, for example, in U.S. patent application Ser. No. 18/087,570 entitled "Generating Object Representations Using a Variable Autoencoder" filed on Dec. 22, 2022, the entire contents of which are hereby incorporated by reference herein for all purposes. Additional details for determining clusters of driving scenarios are described with respect to FIG. 2.

In some examples, the database management component may determine a key (e.g., <M,S>) corresponding to the cluster. The key may be a feature vector representation of the map and/or scene data of the driving scenario (e.g., the key data may be a combination of the map and scene or the map and scene representation separately). In some instances, the database management component may input the sensor data corresponding to the cluster into a machine-learning model (e.g., autoencoder) trained to output encoded representation (e.g., vector representation). For instance, the machine-learning model may output an encoded representation (e.g., <M,S>).

In some examples, the database management component may store a key-value pair in a database accessible to one or more vehicles traversing an environment. The key may be <M,S> and the value may include prediction information associated with the object(s) within driving scenario <M,S>. In some instances, prediction information may include a list of the actual trajectories (which may include any one or more subsequent states) of the objects from some or all the driving scenarios (e.g., <scenario>) associated with the key <M,S> (e.g., observed in subsequent timestamps of the log data), or some combination thereof (e.g., a weighted average). Alternatively or additionally, the prediction information may include a list of trajectories (which may include any one or more subsequent states) generated and/or output by one or more machine-learning models and/or a combination thereof. In some examples, the database management component may store the key-value pairs in database. The database may be represented as a lookup table, a tree structure, and/or any other database architecture. In some instances, one or more vehicles may include permissions sufficient to access the database while navigating an environment.

In some examples, a vehicle may receive sensor data from one or more sensor devices while traversing an environment. In some examples, the vehicle may include multiple sensor devices (e.g., lidar device(s), radar device(s), time-of-flight device(s), image capturing device(s), etc.) configured to receive sensor data of the environment. Further, each sensor device may provide unique sensor data representative of the perspective of the sensor device.

In some examples, the vehicle may detect one or more objects based on the sensor data. Specifically, the vehicle may analyze the sensor data to detect and/or classify object(s) within a region of the environment proximate the vehicle. Examples of techniques for performing object detection and/or classification can be found, for example, in U.S. application Ser. No. 17/405,865, filed Aug. 18, 2021, and titled "Determining Object Characteristics Using Unobstructed Sensor Emissions," in U.S. application Ser. No. 16/779,576, filed Jan. 31, 2020, and titled "Object Detection and Tracking," in U.S. patent application Ser. No. 16/587,605, filed Sep. 30, 2019, and titled "Perception System, in U.S. patent application Ser. No. 16/726,097, filed Dec. 23, 2019, and titled "Pedestrian Object Detection Training," in U.S. patent application Ser. No. 16/797,656, filed Feb. 21, 2020, and titled "Combined Track Confidence And Classification Model," and in U.S. patent application Ser. No. 16/457,524, filed Jun. 28, 2019, and titled "Head Detection For Improved Pedestrian Detection, each of which is incorporated by reference herein, in its entirety for all purposes.

Based on detecting object(s) proximate the vehicle (e.g., within some threshold distance, based on the visibility of sensor data, etc.), a prediction component of the vehicle may determine one or more candidate predicted trajectories for some or all the detected object(s). The prediction component may determine the candidate predicted trajectories by retrieving such trajectories from the precomputed database. That is, the prediction component may access and/or determine whether the precomputed database includes a driving scenario (e.g., key) that is sufficiently similar to the current driving scenario. Accordingly, the prediction component may determine or otherwise generate an encoded representation (e.g., feature vector) of the current driving scenario that can be compared with the key(s) in the database.

In some examples, the prediction component may determine a key (e.g., <M,S>) based on the sensor data captured by the vehicle. The prediction component may determine a single key <M,S> representative of the current sensor data; however, in other examples, the prediction component may determine a map key (e.g., <M>) representative of the map data and/or vehicle location data as well as a scene key (e.g., <S>) representative of the object(s) and/or object(s) feature(s). Accordingly, the prediction component may input the sensor data and/or map data into one or more machine-learning models trained to output one or more keys representing the current driving scenario of the vehicle. The prediction component may use the same or different machine-learning model to generate the one or more keys. In such instances, the key or encoded representation may be a feature vector, embedding, or otherwise. Techniques for generating an encoded representation of the sensor data and/or embedded vector representation of such sensor data may be found, for example, in U.S. patent application Ser. No. 18/087,570 entitled "Generating Object Representations Using a Variable Autoencoder" filed on Dec. 22, 2022, the entire contents of which are hereby incorporated by reference herein for all purposes.

Additionally or alternatively, the prediction component may generate a scene key and receive a map key from a database of the vehicle. Since the map data is a static representation of the environment, a computing system may encode the map data during a pre-computation stage, thereby reducing computational expenses and increasing available bandwidth for various components of the vehicle. In such instances, the prediction component may determine a location of the vehicle and use the location to access separate database to retrieve a pre-generated map data feature vector. As such, the prediction component may retrieve a precomputed map encoding based on vehicle location data while inputting sensor data to a machine-learning model trained to output a scene encoding. In such instances, the prediction component may have two feature vectors, a map feature vector and a scene feature vector; however, in other examples, the prediction component may perform one or more operations to concatenate or otherwise combine such feature vectors into a single feature vector.

In some examples, the prediction component may determine whether the precomputed database includes a key that is sufficiently similar to the current key. As such, the prediction component may compare a value of the current feature vector to a value of the feature vector(s) in the database. In at least one example of which, a distance may between the two vectors may be compared to a threshold distance. In yet other examples, one or more differences may be determined for any one or more features between the representations of the scene/scenario (e.g., number of objects proximate the vehicle, relative positions of objects, time of day, number of lanes, relative position of the vehicle, etc.). Further, the prediction component may determine whether the feature vectors (e.g., keys) are sufficiently similar by comparing the result of comparison to a threshold value. For example, the prediction component may determine a distance between the current key $<M,S>$ and a key $<M_1,S_1>$ in the database. If the distance is below a threshold value, the prediction component may determine that the keys, and consequently the driving scenarios, are sufficiently similar. In contrast, if the distance meets or exceeds a threshold value, the prediction component may determine that the keys, and consequently the driving scenarios, are not sufficiently similar.

In other examples, if the prediction component determined a map key and a scene key, the prediction component may determine a distance between the current map key (e.g., $<M>$) and a map data key in the database. This comparison may determine whether the geographic configuration of the current driving scenario is sufficiently similar to that of the driving scenario in the database. The prediction component may determine that the map feature vector of the database is sufficiently similar to the current map data feature vector if the distance is below a threshold value. If the map data feature vectors are sufficiently similar, the prediction component may determine whether the database includes a scene encoding (with the similar map encoding) that is sufficiently similar to that of the scene encoding of the current driving scenario. For instance, the prediction component may determine a distance between the scene vector ($<S>$) of the current key and the scene vector of the matching map key. If the distance is below a threshold value, the prediction component can determine that the scene vector (from the database) is sufficiently similar to the scene vector of the current driving scenario.

In some examples, if a key (e.g., $<M,S>$) from the database is sufficiently similar to the current key, the prediction component may retrieve the prediction information (e.g., the value) associated with the key. If the prediction component determines that the current key is not sufficiently similar to the keys of the database, the prediction component may determine that there is not a driving scenario in the database sufficiently similar to that which the vehicle is experiencing. In such instances, the prediction component may generate candidate predicted trajectories. Accordingly, the prediction component may input the sensor data into one or more machine-learning models trained to output predicted trajectories for the objects. As above, such values may be interpolated or extrapolated from the database, as well. As a non-limiting example of which, if the key is close enough to a key within the database, the associated value may be interpolated from the nearest n (e.g., 1, 2, 3, 4, or more) keys within the database.

Examples of techniques for predicting trajectories for objects in an environment can be found, for example, in U.S. Pat. No. 11,169,531, issued Nov. 9, 2021, and titled "Trajectory Prediction on Top-Down Scenes," the contents of which is herein incorporated by reference in its entirety and for all purposes.

In some examples, the prediction component may send the candidate predicted trajectories to one or more of a perception, a prediction, and/or a planning component for further processing. In such examples, the candidate predicted trajectories may be analyzed and processed in planning future vehicle actions.

Alternatively or additionally, the prediction component may retrieve predicted trajectories from the database for a subset of detected objects. For instance, the prediction component may identify relevant and/or non-relevant objects based on the sensor data. In such instances, the prediction component may receive predicted trajectories from the database for the non-relevant objects while generating (on-vehicle) predicted trajectories for the relevant objects, or vice-versa. Reducing the number of objects for which the prediction component generates predicted trajectories may improve computational efficiency and/or increase computing speeds which may increase bandwidth available to other vehicle components.

The prediction component may determine and/or identify one or more relevant objects. Since some objects may not be relevant to a vehicle's operations, such as by navigating in a different direction from the vehicle or lacking an intent to move in such a manner, the prediction component may identify a subset of relevant objects from the list of detected objects. Techniques for identifying relevant objects may be found, for example, in U.S. patent application Ser. No. 18/132,289 entitled "Machine-Learned Model for Detecting Object Relevance to Vehicle Operation Planning" filed on Apr. 7, 2023, the entire contents of which are hereby incorporated by reference herein for all purposes.

Alternatively or additionally, when retrieving predicted trajectories from the database, the prediction component may retrieve predicted trajectories that are consistent with the vehicle's navigational path and/or direction of travel. That is, upon identifying a key in the database that is sufficiently similar to the current key, the prediction component may identify predicted driving scenarios that are consistent with the vehicle's trajectory. For instance, if the vehicle has a trajectory instructing the vehicle to turn right, the prediction component may not retrieve prediction information in which the vehicle is to navigate in a direction other than right.

The techniques described herein can improve the functioning, safety, and efficiency of the autonomous and semi-autonomous vehicles operating in various driving environments by using a precomputed database containing predicted trajectories to efficiently allow a vehicle to query the database for similar driving scenarios (as the vehicle is currently in) while navigating the environment. Determining the database in a precomputation stage as described herein may improve computational efficiency by reducing the amount of processing for the vehicle to perform in order to receive and/or determine predicted trajectories for the potential multiple different objects. The improved computation efficiency can increase computing speeds which may enable the vehicle to determine predicted trajectories for detected objects sooner, thereby enabling the vehicle to determine vehicle trajectories sooner.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for receiving sensor data, encoding the sensor data, determining a predicted trajectory based on the encoded sensor data, and controlling the vehicle based on the predicted trajectory. As shown in this example, some or all the operations in the example process 100 may be performed by a prediction component and/or other component or systems within an autonomous vehicle. For instance, as shown in this example, example process 100 may be implemented using a prediction component 102. As described below in more detail, the prediction component 102 may include various components, such as a predictive caching component, a trajectory retrieval component, and/or a trajectory generating component, which may be configured to receive sensor data, encode the sensor data, determine predicted trajectories based on the encoding, and/or controlling the vehicle based on the predicted trajectories.

At operation 104, the prediction component 102 may receive sensor data collected by one or more sensor devices of an autonomous vehicle. In some examples, a vehicle may include multiple sensor devices mounted at various locations and various angles relative to the vehicle, to capture sensor data of a driving environment. For example, box 106 illustrates an autonomous vehicle 108 navigating an environment and capturing sensor data reflected from a plurality of objects in the environment. In this example, the autonomous vehicle 108 may be approaching a junction including an object 110, an object 112, and an object 114. As shown in box 106, the object 110 may be a vehicle, the object 112 may be a vehicle, and the object 114 may be a pedestrian. However, in other examples, the environment may include any number of objects, each of which may be any type of dynamic object (e.g., a vehicle, a motorcycle, a bicycle, a pedestrian, an animal, etc.) or static object (e.g., a building, a road surface feature, a tree, a sign, a barrier, a parked vehicle, etc.). In other examples, there may be more or less objects at various locations within the environment.

At operation 116, the prediction component 102 may determine encoded data based on the sensor data received at operation 104. Such an encoding may be representative of a single object (e.g., as may be centered on the object), the entire scene, or any portion thereof. In some examples, the autonomous vehicle 108 may include a precomputed database containing predicted trajectories corresponding to objects positioned at various locations relative the vehicle 108. As noted above, such predicted trajectories may be stored in a key-value pair system with the key being an encoded representation (e.g., feature vector) of the map and/or scene data of the driving scenario and the value being a list of trajectories. As such, the prediction component 102 may use the sensor data (obtained at operation 104) to determine an encoded representation of the current environment. For example, box 118 includes a flow diagram illustrating an example process for determining encoded data 128. In this example, the box 118 may include scene data 120 and map data 122 which may be obtained and/or evaluated from the sensor data. The scene data 120 may include a number of object(s), a location of object(s), a type of object(s), a pose of object(s), a kinematic information of object(s), etc. The map data may include a road geometry, a lane marker, etc. However, this is not intended to be limiting, in other examples the map and scene data may include more or less types of data about more or less objects and/or features of the environment. Additionally or alternatively, the map and scene data may be used to determine a single encoding. As a non-limiting example of which, a top-down representation of the scene may be created having different layers for different pieces of data (e.g., one layer representative of traffic lanes, one indicative of objects, and the like). Such a representation may be used directly or input into an encoder, for example, to determine an embedding, though any other encoding is contemplated.

As shown in FIG. 1, the prediction component 102 may input the map and scene data to one or more encoders to generate encoded data. In this example, the prediction component 102 may input the scene data 120 to a scene encoder 124 and input the map data 122 into a map encoder 126. Though shown as inputting the map and scene data into different encoders, in other examples, the prediction component 102 may input the map and scene data into a single encoder configured to output encoded data 128 representative of the current driving scenario as illustrated in box 106. In some examples, the scene encoder 124 and the map encoder 126 may output encoded data 128. Though shown as a single encoded data 128, in other examples, the scene encoder 124 may output a scene encoding <S> and the map encoder 126 may output a map encoding <M>. The encoded data 128 may be a feature vector or embedding that represents the various elements and/or features observed in the sensor data. Additional details for encoding sensor data are described with respect to FIG. 2.

At operation 130, the prediction component 102 may determine predicted trajectories based on the encoded data determined at operation 116. In some examples, the prediction component 102 may retrieve candidate predicted trajectories to associated with one or more objects based on accessing a precomputed database containing a plurality of predicted driving scenarios (e.g., scenarios). In some instances, the database may be represented as a lookup table that includes a key-value pair in some or all cells. For example, box 132 illustrates an example lookup table 134 containing multiple key-value pairs. In this example, the box 132 may include a representation of the encoded data 128 that was generated at operation 116. Though illustrated as <M,S>, in other examples the encoded data 128 may be represented as one or more numerical values. In this example, the lookup table 134 may have three rows and four columns; however, in other examples the lookup table 134 may have more or less rows and/or columns. In some examples, cells of the lookup table 134 may include a key-value pair. The key may be an encoded feature vector representing a specific driving scenario. As shown in box 132, a key in the top left cell may be <M1,S1> with the cell to the right having a key of <M1,S2>. In such instances, both cells may include a driving scenarios that has similar or identical map data (e.g., road geometry, lane marker location, lane marker type, traffic signals and/or sign use and/or locations, etc.) while having different representation of the scene data (e.g., different number of objects (or relevant objects), object(s) in different locations, different object types, etc.). The value may include prediction information for some or all objects proximate the vehicle. Specifically, the prediction information may include previously observed trajectories followed by objects at a previous time or trajectories generated by one or more machine-learning models. In such instances, the prediction information may include one or more candidate predicted trajectories for some or all objects.

In some examples, the prediction component 102 may determine whether the lookup table 134 has a key that is sufficiently similar to the encoded data 128. For example, the prediction component 102 may compare the encoded data 128 to the encoded key from some or all cells of the lookup table 134. After comparing the encoded data 128 with the encoded key from the cell, the prediction component may determine whether the result is below a threshold value. If the result is below a threshold value, the prediction component may determine that the key in the cell is sufficiently similar to the encoded data 128. However, if the result meets or exceeds a threshold value, the prediction component 102 may determine that the key in the cell is not sufficiently similar and may proceed to comparing the encoded data 128 with the keys of one or more cells in the lookup table 134. Additional details for comparing the encoded data 128 with keys in the lookup table 134 are described with respect to FIG. 2.

In some examples, the prediction component 102 may retrieve predicted trajectories from the lookup table. That is, upon identifying a key in the lookup table 134 that is sufficiently similar to the encoded data 128, the prediction component 102 may retrieve the value (e.g., prediction information, scenarios, etc.) corresponding to the key.

At operation 136, the prediction component 102 may control the vehicle based on the predicted trajectories determined at operation 130. In some examples, the prediction component 102 may receive the prediction information from the lookup table 134 (e.g., database). As such, the prediction component 102 may associate the prediction information with the one or more objects proximate the vehicle 108. For example, box 138 illustrates the detected objects (as shown in box 106) with predicted trajectories. In this example, object 110 has a predicted trajectory 140 that predicts that the object 110 may navigate through the intersection, object 112 has a predicted trajectory 142 that predicts that the object 112 may turn right upon entering the intersection, and object 114 has a predicted trajectory 144 that predicts that the object 114 may enter the intersection via a crosswalk. Of course, in other examples, the predicted trajectories of the objects may predict the objects navigate in different directions. In some examples, the prediction component 102 may send such prediction data to one or more planning components of the vehicle 108 which may be configured to generate a trajectory 146 for the vehicle 108 to follow safely and efficiently through the environment.

Figure 2:
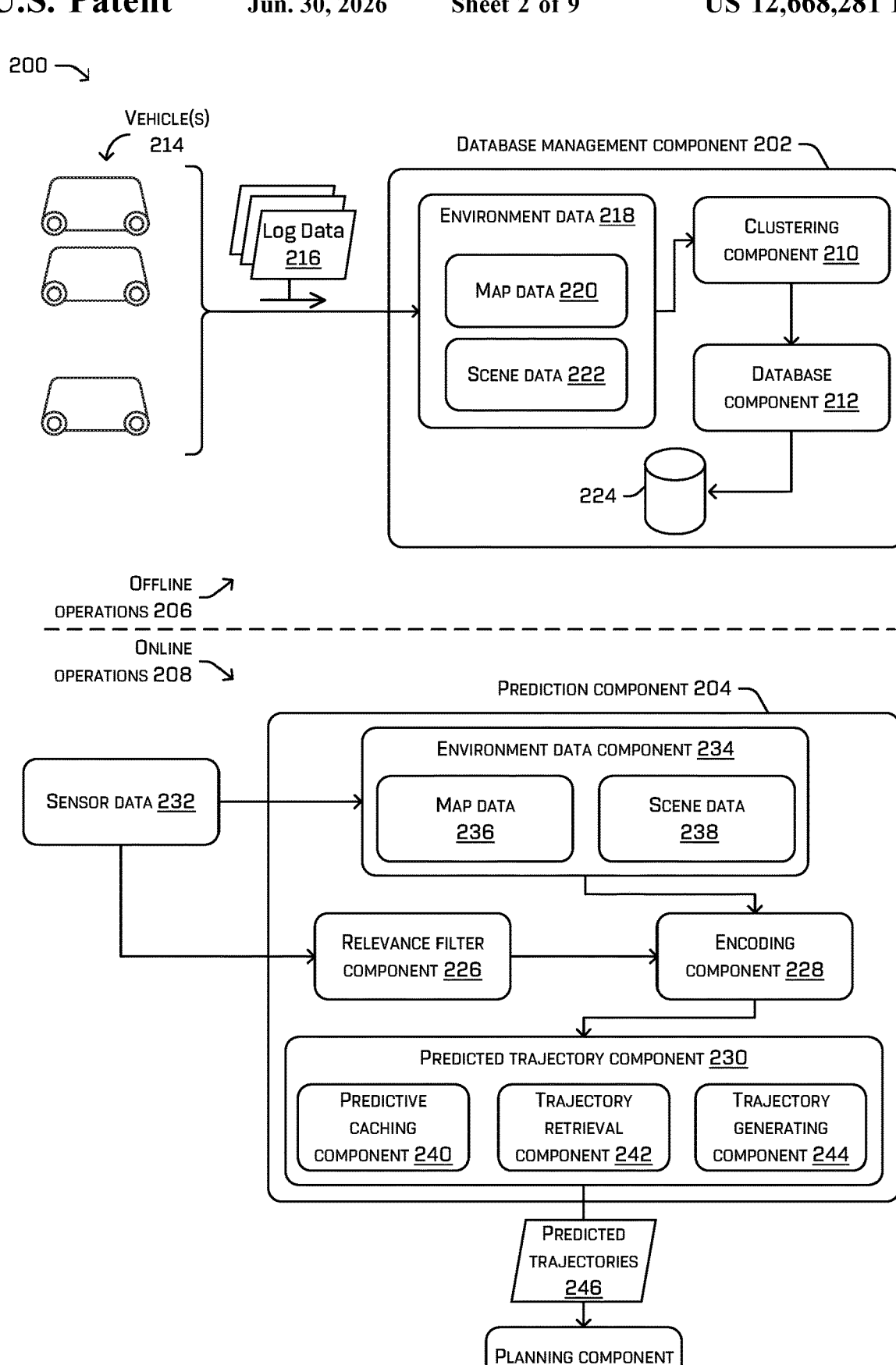
FIG. 2 illustrates an example computing system including a database management component configured to generate a database containing predicted trajectories accessible to a prediction component of a vehicle navigating an environment, in accordance with one or more examples of the disclosure.

FIG. 2 illustrates an example computing system 200 including a database management component 202 configured to generate a database containing predicted trajectories accessible to a prediction component 204 of a vehicle navigating an environment. As shown in FIG. 2, the operations performed by the database management component 202 may be offline operations 206 and the operations performed by the prediction component 204 may be online (or on-vehicle) operations 208.

In some examples, the database management component 202 may include various components, described below, configured to perform different functionalities of a database generating technique. In some examples, some or all subcomponents of the database management component 202 may be integrated in a remote server-based system while other subcomponents may be integrated in on-vehicle systems. In some examples, the database management component 202 may include a clustering component 210 configured to determine clusters of similar driving scenarios and a database component 212 configured to generate a database based on the clusters of driving scenarios.

As discussed above, generating a database containing predicted driving scenarios during a pre-computation stage derived from the world driving log data may improve the vehicle safety and efficiency. In this example, one or more vehicles 214 operating on various roadways in real world conditions and environments may be in communication with the database management component 202 implemented remotely from the vehicle 214. The vehicle 214 may capture and provide log data 216 to the database management component 202. As discussed above, the log data 216 may include, for example, image data, radar data, lidar data, time-of-flight data, and the like for various driving scenes encountered by the vehicle 214, as well as additional log data such as perception data, prediction data, trajectory information, and the like.

Vehicles 214 may capture log data 216 while located in a variety of different driving environments. For instance, such driving environments may vary based on a road geometry (e.g., T-intersection, three-way stop, straight road, curved road, etc.), a number of lanes, a type of lane marker (e.g., color of lane (e.g., yellow, white, etc.), dashed lane, solid single lane, solid double lane, etc.), a speed limit, a number of objects, a type of object (e.g., static, dynamic (e.g., vehicle (e.g., small car, semi-truck, etc.), pedestrian, animal, etc.), a feature of the object (e.g., a pose, a trajectory, a velocity, an acceleration, etc.), and/or any other factor. In some examples, the log data 216 may include one or more driving scenarios. A driving scenario may include the associated map data, vehicle information (e.g., trajectory data (e.g., velocity, acceleration steering angle, etc.), pose data, etc.), object information (e.g., a trajectory of the object(s), a pose of the object(s), a number of object(s), a type of the object(s), a past trajectory of the object(s), etc.) and/or any other information. Log data may also include, without limitation, output of any one or more component (e.g., perception, prediction, planning, etc.), actuator messages, ECU messages, or otherwise generated during or in response to the sensor data.

As shown in FIG. 2, the vehicles 214 may send the log data 216 to the database management component 202. The database management component 202 may include an environment data component 218 configured to receive, store, and/or synchronize log data 216 from the vehicles 214. The environment data component 218 may include various subcomponents, described below, to receive, store, synchronize, and/or analyze the log data 216. As shown in FIG. 2, the illustrated subcomponents are some of the possible features capable of being observed from the log data 216. In some examples, the environment data component 218 may include more or less subcomponents.

In this example, the environment data component 218 may include one or more subcomponents associated with different features of the log data 216. For instance, the environment data component 218 may include a map data component 220 configured to receive, determine, store, and/or synchronize map data (e.g., data associated with static objects and/or features of an environment) corresponding to a driving scenario and a scene data component 222 configured to receive, determine, store, and/or synchronize scene data (e.g., number of object(s), location of object(s), type of object(s), pose of object(s), kinematic information of object(s), etc.) corresponding to the driving scenario.

In some examples, the database management component 202 may include a clustering component 210 configured to determine clusters of similar driving scenarios as represented in the log data 216. In some examples, the database management component 202 may determine a total number of clusters to generate or otherwise determine. That is, the database management component 202 may determine how many clusters to determine based on overall memory consumption, environment type, and/or any other factor.

In some examples, the clustering component 210 may receive map data and/or scene data from the environment data component 218. The clustering component 210 may determine encoded representations for some or all driving scenarios from the log data 216. Such encoded representations may be feature vectors or embeddings representative of the driving scenario. In some examples, the clustering component 210 may cluster driving scenarios based on comparing the encoded representations associated therewith. For example, the clustering component 210 may cluster driving scenarios based on determining whether a distance between encoded representations is within a threshold distance. If the distance is below the threshold, the clustering component 210 may determine that the encoded representations are sufficiently similar. In such instances, the threshold may be modified based on the total number of clusters to generate, desired similarity between driving scenarios (e.g., smaller threshold ensures higher similarity in driving scenarios), desired coverage (e.g., available actions) and/or diversity (e.g., wide range and/or types of vehicle actions) (e.g., larger threshold ensures a more diverse set of driving scenarios). Additional or alternative methods may be used including, but not limited to, k-means, k-medoids, DBSCAN, or otherwise. In some examples, upon determining the clusters of driving scenarios, the clustering component 210 may determine that each cluster includes a key (e.g., encoded representation/data) which is a representative of the cluster (e.g., the average value of the cluster). In such instances, the clustering component 210 may determine or otherwise generate prediction information to be the value in the key-value pair.

In some examples, the clustering component 210 and/or the database management component 202 may determine prediction information to associate with the clusters of driving scenarios. Prediction information may include actual trajectories (e.g., trajectories followed by objects in the log data 216) and/or generated trajectories. The representative value associated with the representative of the cluster may, in some examples, comprise the average of trajectories of associated examples of the cluster. In some examples, the clustering component 210 may generate trajectories using on one or more machine-learning models. For instance, the clustering component 210 may use one or more machine-learning models trained to generate and/or build a trajectory based on inputting the sensor data associated with the driving scenario into the model. In some such examples, the predicted trajectories may be output from a prediction model and recorded in the log data or generated. That is, the clustering component 210 may input sensor data into a model trained to output trajectories and/or future states of the vehicle and/or objects. In any example described herein, the predicted trajectory may comprise one or more future states of one or more of the objects. In those examples in which a single future state is stored by the model, trajectories may be determined by recursively inputting the model outputs back into the model to determine a trajectory to a desired time horizon.

In some examples, the database management component 202 may include a database component 212 configured to generate a database based on the clustered driving scenarios. Upon determining or otherwise generating the key-value pairs, the database component 212 may generate or otherwise update a database 224 based on the key-value pairs. That is, the database component 212 may modify or otherwise update the database 224 by sending key-value pairs to be stored therein. In such instances, the database 224 may be transmitted to one or more vehicles (or fleet of vehicles). Such vehicles may be able to access and/or utilize database 224 while navigating through an environment.

Figure 3:
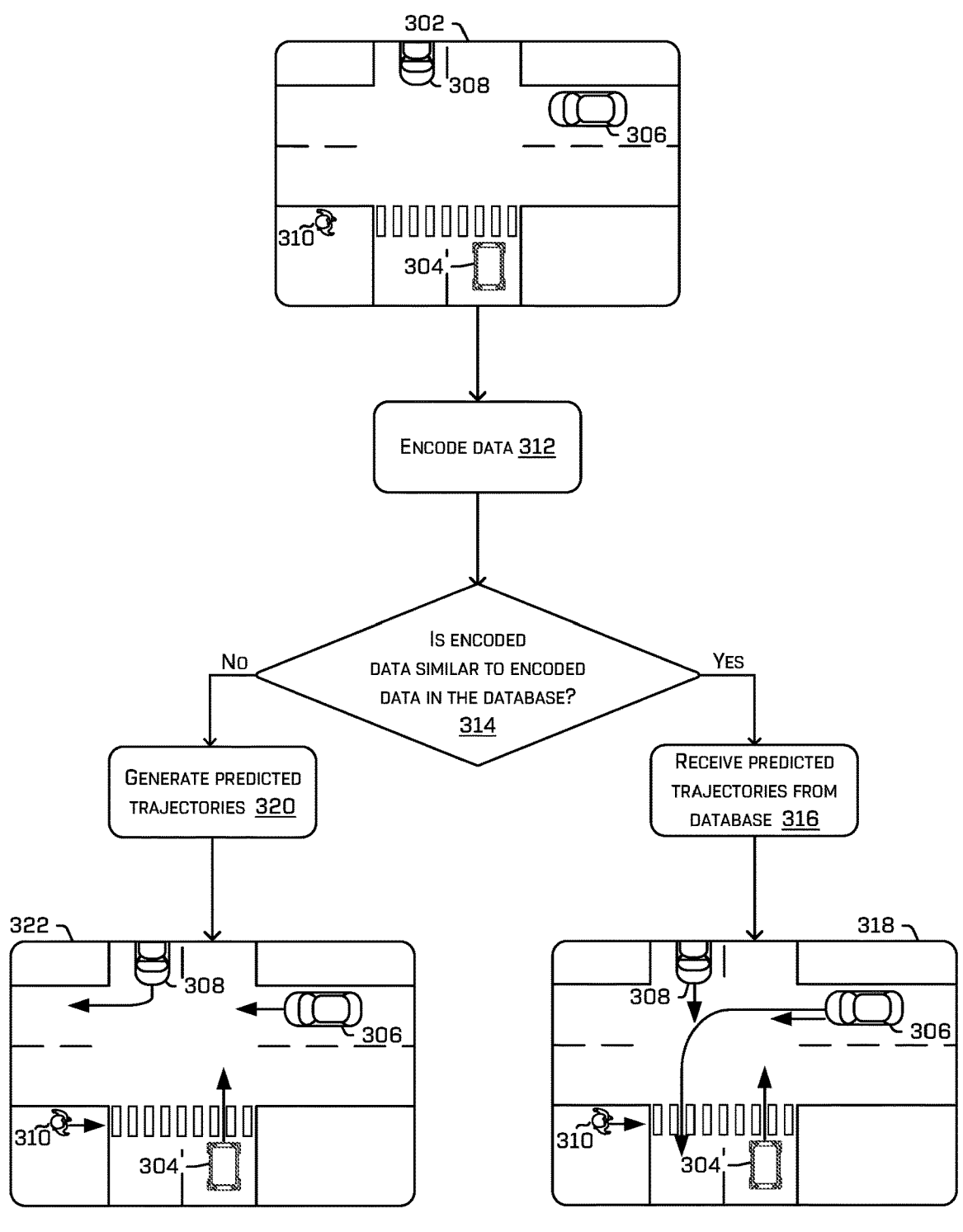
FIG. 3 is a pictorial flow diagram illustrating an example technique for receiving sensor data, encoding the sensor data, accessing a pre-computed database, and receiving predicted trajectories associated with detected objects, in accordance with one or more examples of the disclosure.

As shown in FIG. 2, the operations performed by the database management component 202 as the components illustrated therein may be offline operations 206. Further, FIG. 3 illustrates that the operations performed by the prediction component 204 and the components shown therein may be online operations 208 (e.g., operations that take place on the vehicle).

In some examples, the prediction component 204 may be similar or identical to the prediction component 102 described above, or in any other examples herein. In some examples, the prediction component 204 may include various components, described below, configured to perform different functionalities of a predicted trajectory determining technique. In some examples, some or all of the subcomponents of the prediction component 204 may be integrated in a remote server-based system while other subcomponents may be integrated in on-vehicle systems. In some examples, the prediction component 204 may include a relevance filter component 226 configured to identify relevant object(s), an encoding component 228 configured to encode sensor data (e.g., map data and/or scene data), and a predicted trajectory component 230 configured to determine, receive, or otherwise generate a predicted trajectory for detected objects.

In some examples, the prediction component 204 may receive sensor data 232 from one or more sensor devices within (or otherwise associated with) and/or perception components of the autonomous vehicle. As shown in FIG. 2, an environment data component 234 of the prediction component 204 may receive the sensor data 232 from the sensor device(s), perception component(s), and/or prediction component(s). In some instances, the environment data component 234 may include one or more subcomponents associated with different features of the sensor data 232. For instance, the environment data component 234 may include a map data component 236 configured to receive, determine, store, and/or synchronize map data (e.g., data associated with static objects and/or features of an environment) corresponding to a driving scenario and a scene data component 238 configured to receive, determine, store, and/or synchronize scene data (e.g., number of object(s), location of object(s), type of object(s), pose of object(s), kinematic information of object(s), etc.) corresponding to a driving scenario.

In some examples, the prediction component 204 may include a relevance filter component 226 configured to identify relevant objects proximate the vehicle. The relevance filter component 226 may be used optimize the predicted trajectory generation technique. That is, the relevance filter component 226 may enable the prediction component 204 to offload a portion of the predicted trajectory generating for some or all relevant or non-relevant objects, thereby increasing the overall bandwidth available to one or more downstream vehicle components. The relevance filter component 226 may determine whether an object is relevant based on a variety of factors, such as proximity to the vehicle (e.g., within a threshold distance to the vehicle), location of the object relative to the path of the vehicle, predicted intent of the object (e.g., intent to remain stopped, intent to remain in motion, intent to start moving, intent to stop, etc.), and/or any other factor. Additional techniques for determining or otherwise identifying relevant objects may be found, for example, in U.S. patent application Ser. No. 17/854,269, titled "Identifying Relevant Objects Within an Environment" and filed Jun. 30, 2022, which is incorporated by reference herein in its entirety. In some examples, the relevance filter component 226 may send a list of one or more relevant objects and/or a list of one or more non-relevant objects to the encoding component 228 and/or the predicted trajectory component 230.

In some examples, the prediction component 204 may include an encoding component 228 configured to configured to encode sensor data (e.g., map data and/or scene data). The encoding component 228 may receive a list of relevant and/or non-relevant objects from the relevance filter component 226. Further, the encoding component 228 may receive map and/or scene data from the environment data component 234. In some examples, the encoding component 228 may determine an encoded representation of the driving scenario. The encoding component 228 may include one or more machine-learning models trained to receive map data and/or scene data and output an encoded representation (e.g., key) of the map data, an encoded representation (e.g., key) of the scene data, and/or an encoded representation of both the map and scene data. Techniques for generating an encoded representation of the sensor data and/or feature vector representation of such sensor data may be found, for example, in U.S. patent application Ser. No. 18/087,570 entitled "Generating Object Representations Using a Variable Autoencoder" filed on Dec. 22, 2022, the entire contents of which are hereby incorporated by reference herein for all purposes. In some examples, the encoding component 228 may send encoded data to the predicted trajectory component 230.

In some examples, the prediction component 204 may include a predicted trajectory component 230 configured to determine, receive, or otherwise generate a predicted trajectory for detected objects. The predicted trajectory component 230 may receive or otherwise request encoded data, map data, and/or scene data from the encoding component 228 and/or the environment data component 234. In some examples, the predicted trajectory component 230 may include subcomponents which may include a predictive caching component 240, a trajectory retrieval component 242, and/or a trajectory generating component 244.

In some examples, the trajectory retrieval component 242 may be configured to retrieve one or more predicted trajectories from a precomputed database. The trajectory retrieval component 242 may access the database 224 to retrieve predicted trajectories to associate with detected objects. In some examples, the trajectory retrieval component 242 may determine whether the database 224 includes a key (e.g., encoded representation) that is sufficiently similar to the encoded data generated by the encoding component 228 and/or whether the object meets or exceeds a threshold level of relevancy.

If the database 224 does not include a key that is sufficiently similar to the encoded data, if the object is of a particular classification (e.g., pedestrian, animal, cyclist, etc.), and/or if the level of relevancy is at or above a threshold relevancy level, the trajectory retrieval component 242 may generate predicted trajectories on-vehicle. For instance, upon classifying one or more of the objects in the environment as a pedestrian, an animal, or a cyclist, the trajectory generating component 244 may generate, on-vehicle, predicted trajectories to associated with such objects. In contrast, if the database 224 has a key that is sufficiently similar to the encoded data and/or the relevancy does not meet or exceed a relevancy threshold, the trajectory retrieval component 242 may retrieve the prediction information corresponding to the key in the database 224.

Additionally or alternatively, the trajectory retrieval component 242 may receive or otherwise determine predicted trajectories from the database 224 based on interpolating between two or more keys and/or predicted information in the database 224. Since the database may not include every driving scenario (e.g., map and scene data combination), the trajectory retrieval component 242 may interpolate between two or more key-value pairs that are within a threshold distance from the encoded data of the actual driving scene. For example, the trajectory retrieval component 242 may identify the n-nearest (e.g., 1, 2, 3, 4, or more) keys to that of the current encoded data. In such instances, the trajectory retrieval component 242 may identify the nearest (e.g., distance between the current encoded data and the key is within a threshold range) keys and interpolate between such key-value pairs to retrieve the prediction information. When interpolating between the key-value pairs, the trajectory retrieval component 242 may associate a weight the keys based on the distance from the current encoded data. For example, a key that is the closest to the current encoded data may be weighted higher than a key that is not as close to the current encoded data. Accordingly, interpolating between the prediction information may include determining an average (or weighted average) between the predicted trajectories of the keys. As such, the trajectory retrieval component 242 may interpolate between the prediction information and send such interpolated data (e.g., predicted trajectories 246) to a planning component 248.

Additionally or alternatively, upon identifying a key in the database 224 that is sufficiently similar to the encoded data of the real driving scenario, the trajectory retrieval component 242 may send the prediction information to planning components and/or input the prediction information to one or more machine-learning models trained to generate and/or refine the prediction information. Techniques for autoregressively generating prediction information may be found, for example, in U.S. patent application Ser. No. 18/071,489 entitled "Vehicle Control Using Auto-Regressive Control Distribution Generation Based on World State Embeddings" filed on Nov. 29, 2022, the entire contents of which are hereby incorporated by reference herein for all purposes.

In some examples, the trajectory generating component 244 may be configured to generate one or more predicted trajectories for one or more objects proximate the vehicle. The prediction component 204 may determine that one or more objects proximate the vehicle may be relevant or non-relevant to the vehicle. As such, the trajectory generating component 244 may input data from the environment data component 234 to one or more machine-learning models trained to output one or more predicted trajectories of the objects. In such instances, the trajectory generating component 244 may send the predicted trajectories 246 to a planning component 248.

In some examples, the predictive caching component 240 may be configured to predictively cache driving scenarios stored in the database 224 in a second database. Since accessing and/or evaluating large numbers of keys in the database 224 may cause latency, the predictive caching component 240 may predict one or more future states of the vehicle and identify keys in the database 224 that correspond to such states. In such instances, the predictive caching component 240 may store such keys (and the associated values) in a separate database. As such, the vehicle may access the separate database to quickly retrieve the predicted key-value pairs, reducing compute time for the vehicle. Additional details for predictively caching key-value pairs in a separate database are described in more depth in FIG. 5.

In some examples, the prediction component 204 may send the predicted trajectories 246 to a planning component 248. In some examples the planning component 248 may use the predicted trajectories 246 to determine future actions of the vehicle. That is, the planning component 248 may analyze and/or evaluate the predicted trajectories 246 to ensure the vehicle follows a safe and efficient path through the environment relative to the objects. In some examples, the prediction component 204 may use one or more machine-learning models trained to generate and/or build a trajectory based on inputting the prediction information into the model. That is, the prediction component 204 may input sensor data and/or the prediction information (obtained from the database) to a model trained to output trajectories and/or future states of the vehicle and/or objects. In such instances, the prediction component 204 may input the trajectories and/or future states into the model to receive additional future states of the vehicle and/or trajectories. Techniques for autoregressively generating prediction information may be found, for example, in U.S. patent application Ser. No. 18/071,489 entitled "Vehicle Control Using Auto-Regressive Control Distribution Generation Based on World State Embeddings" filed on Nov. 29, 2022, the entire contents of which are hereby incorporated by reference herein for all purposes.

FIG. 3 is a pictorial flow diagram illustrating an example process 300 for receiving sensor data, encoding the sensor data, accessing a pre-computed database, and receiving predicted trajectories associated with detected objects.

As shown in FIG. 3, the example process 300 may include a driving scenario 302. The driving scenario 302 may include an autonomous vehicle 304 approaching a junction including an object 306, an object 308, and an object 310. As shown in the driving scenario 302, the object 306 may be a vehicle, the object 308 may be a vehicle, and the object 310 may be a pedestrian. However, in other examples, the driving scenario 302 may include any number of objects, each of which may be any type of dynamic object (e.g., a vehicle, a motorcycle, a bicycle, a pedestrian, an animal, etc.) or static object (e.g., a building, a road surface feature, a tree, a sign, a barrier, a parked vehicle, etc.).

In some examples, the example process 300 may include generating or otherwise determining encoded data 312 based on the sensor data received and/or analyzed from the driving scenario 302. The vehicle 304 may include multiple sensor devices configured to capture sensor data of the driving scenario 302. In some examples, the vehicle 304 may input such sensor data to one or more machine-learning models trained to output encoded data 312 (e.g., <M,S>).

At operation 314, the vehicle 304 may determine whether the encoded data 312 is sufficiently similar to the encoded data contained in the database. That is, the vehicle 304 may determine whether the encoded data 312 (e.g., key) is sufficiently similar to at least one of the database encoded data (e.g., key) based on comparing a distance, for example, between the two keys to a threshold value. If the vehicle 304 determines that the database includes a key sufficiently similar to the encoded data 312 (314: Yes), the vehicle 304 may receive predicted trajectories from the database. That is, at operation 316, the vehicle 304 may retrieve some or all of the predicted trajectories based on the keys being similar. Accordingly, the vehicle 304 may decode the key-value embeddings (e.g., using a decoder trained to decode encoded data into predicted trajectories) such that the embeddings are represented as predicted trajectories. In such instances and as shown in the environment 318, the vehicle 304 may receive multiple predicted trajectories for the object 306, the first of which predicting that the object 306 may turn left upon entering the intersection and the second predicting that the object 306 may navigate through the intersection, a predicted trajectory for the object 308 that predicts that the object 308 may navigate through the intersection, and a predicted trajectory for the object 310 that predicts the object 310 may enter the intersection via a crosswalk. Of course, this is merely an example and in other examples the trajectories may predict that the objects navigate in different directions.

In contrast, if the vehicle 304 determines that the database does not include a key (e.g., encoded data) sufficiently similar to the encoded data 312 (314: No), the vehicle 304 may generate predicted trajectories for the objects. That is, at operations 320, the vehicle 304 may generate some or all the predicted trajectories based on the database not having a key similar to the encoded data 312. In such instances and as shown in the environment 322, the vehicle 304 may generate a predicted trajectory for the object 306 that predicts that the object 306 may navigate through the intersection, a predicted trajectory for the object 308 that predicts that the object 308 may navigate turn right upon entering the intersection, and a predicted trajectory for the object 310 that predicts the object 310 may enter the intersection via a crosswalk. Of course, this is merely an example and in other examples the trajectories may predict that the objects navigate in different direction.

In some examples, the vehicle 304 may generate predicted trajectories for a portion of the objects while retrieving predicted trajectories from the database for the remaining objects. Further, though shown that the predicted trajectories generated by the vehicle 304 may be different than the trajectories obtained from the database, in other examples the trajectories may be similar or identical.

Figure 4:
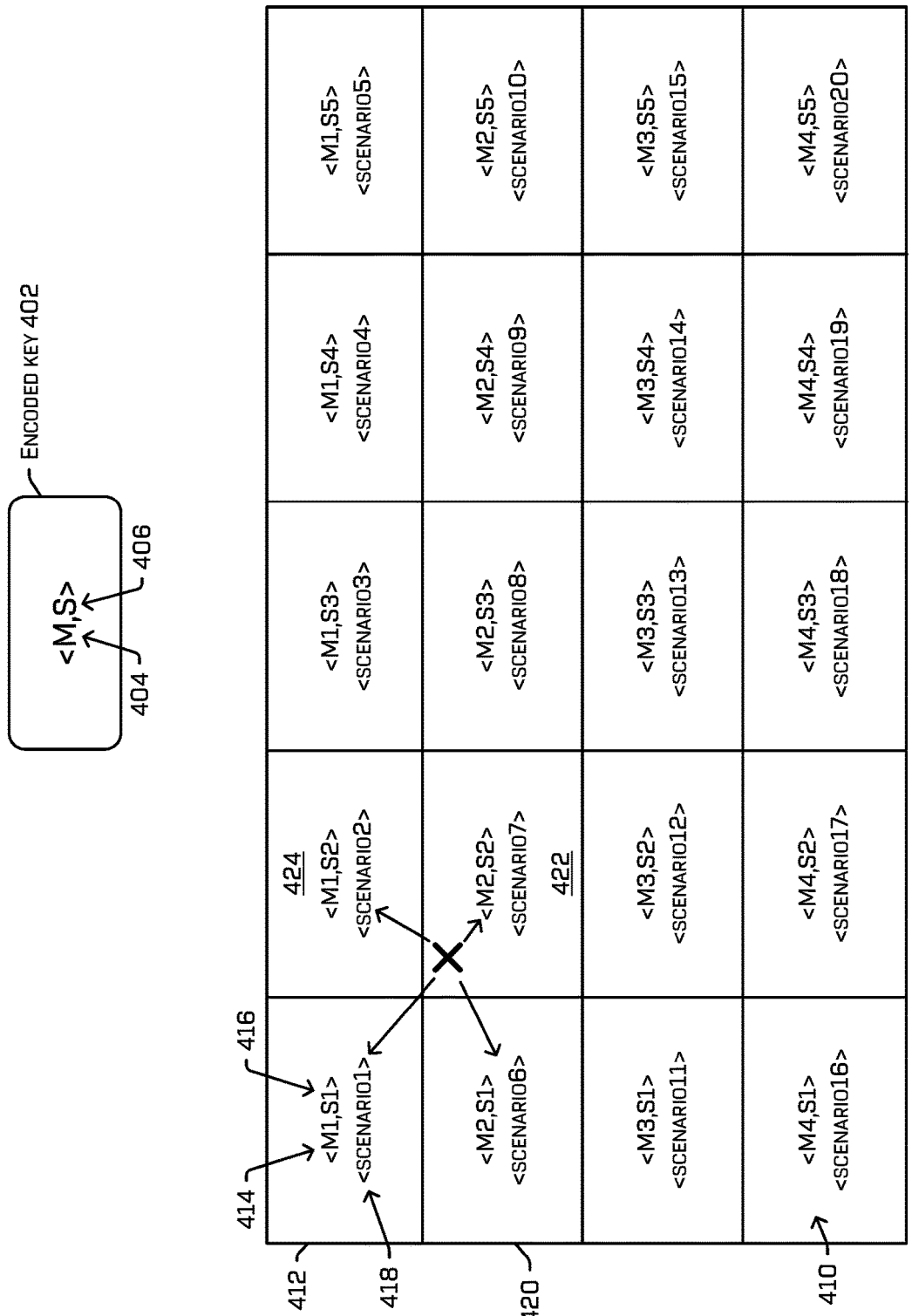
FIG. 4 illustrates an example database represented as a lookup table containing a plurality of key-value pairs determined in a precomputation stage, in accordance with one or more examples of the disclosure.

FIG. 4 illustrates an example lookup table 400 of a database containing a plurality of key-value pairs determined in a precomputation stage. Specifically, FIG. 4 illustrates the architecture of the database and/or how a vehicle may determine whether the database includes a driving scenario that is sufficiently similar to the driving scenario the vehicle experiencing at a moment in time.

In this example, the lookup table 400 may be similar or identical to the lookup table 134 described in FIGS. 1-3. In some examples, FIG. 4 illustrates a box including an encoded key 402. Specifically, the encoded key 402 is illustrated as a single key, <M,S>. However, in other examples, the encoded key 402 may be illustrated as separate map and scene keys. In some examples, the vehicle may use the encoded key 402 to retrieve prediction information from the lookup table 400.

In some examples, the example lookup table 400 may include multiple cells 410. For example, the lookup table 400 may include four rows of cells 410 and five columns of cells 410. Of course, in other examples, the lookup table 400 may include more or less rows and/or columns. As shown in FIG. 4, the cells 410 may include a key and a value. The key may be an encoded representation of a driving scenario experienced by one or more vehicles at a previous time (e.g., log data). In various examples, the driving scenario may be one of the scenarios of the cluster previously determined and/or some combination of all scenarios of the cluster. The value may be prediction information that includes actual trajectories (e.g., one or more future states) observed by the one or more vehicles and/or trajectories generated by one or more machine-learning models. In those examples in which a single future state is stored as the value, the value may subsequently be used as a further input to reference, or otherwise refer to a different cell within the lookup table 400 any number of times to recursively determine a trajectory of user-defined length. In some examples, the prediction information may include one or more trajectories for some or all objects proximate the vehicle.

In some examples, the vehicle may determine whether the encoded key 402 is sufficiently similar to the key(s) of the lookup table 400. For example, the vehicle may compare the encoded key 402 to the key in a cell. As shown, the vehicle may compare the map encoding 404 to a map encoding 414 of a cell 412. If the distance between the map encoding 404 and the map encoding 414 is below a threshold, the vehicle may determine that the map data of the current environment is sufficiently similar to the map data of the driving environment as represented by the map encoding 414. As such, based on the map encoding 414 being sufficiently similar to the map encoding 404, the vehicle may determine whether the database includes a key with a scene encoding that is sufficiently similar to the scene encoding 406. In such instances, the vehicle may compare the scene encoding 406 with the scene encoding 416 of the cell 412. If the distance between such encodings meets or exceeds a threshold value, the vehicle may determine whether a different key with the same or similar map encoding has a scene encoding that is sufficiently similar. In contrast, if the scene encoding 416 is sufficiently similar to the scene encoding 406, the vehicle may retrieve the prediction information 418 stored in the cell 412.

As shown in FIG. 4, the example lookup table 400 may include an "X" that represents a location of the encoded key 402 with respect to the encoded keys of the lookup table 400. In such instances, when retrieving prediction information from the lookup table, the vehicle can interpolate between two or more key-value pairs. In this example, the four nearest key-value pairs may be the encoded data in cell 412, the encoded data in cell 420, the encoded data in cell 422, and the encoded data in cell 424. Of course, this is merely an example and in other examples the vehicle may interpolate between more or fewer cells. In this example, the location of the "X" may be closest to the encoded data in cell 422, second closest to the encoded data in cell 424, third closest to the encoded data in cell 420, and fourth closest to the encoded data in cell 412. In such instances, the vehicle may determine prediction information based on a weighted average between the prediction information in the four cells. In such instances, when determining the prediction information, the vehicle may weight the prediction information in cell 420 the highest, the prediction information in cell 424 the second highest, the prediction information in cell 420 the third highest, and the prediction information in cell 412 the lowest.

Figure 5:
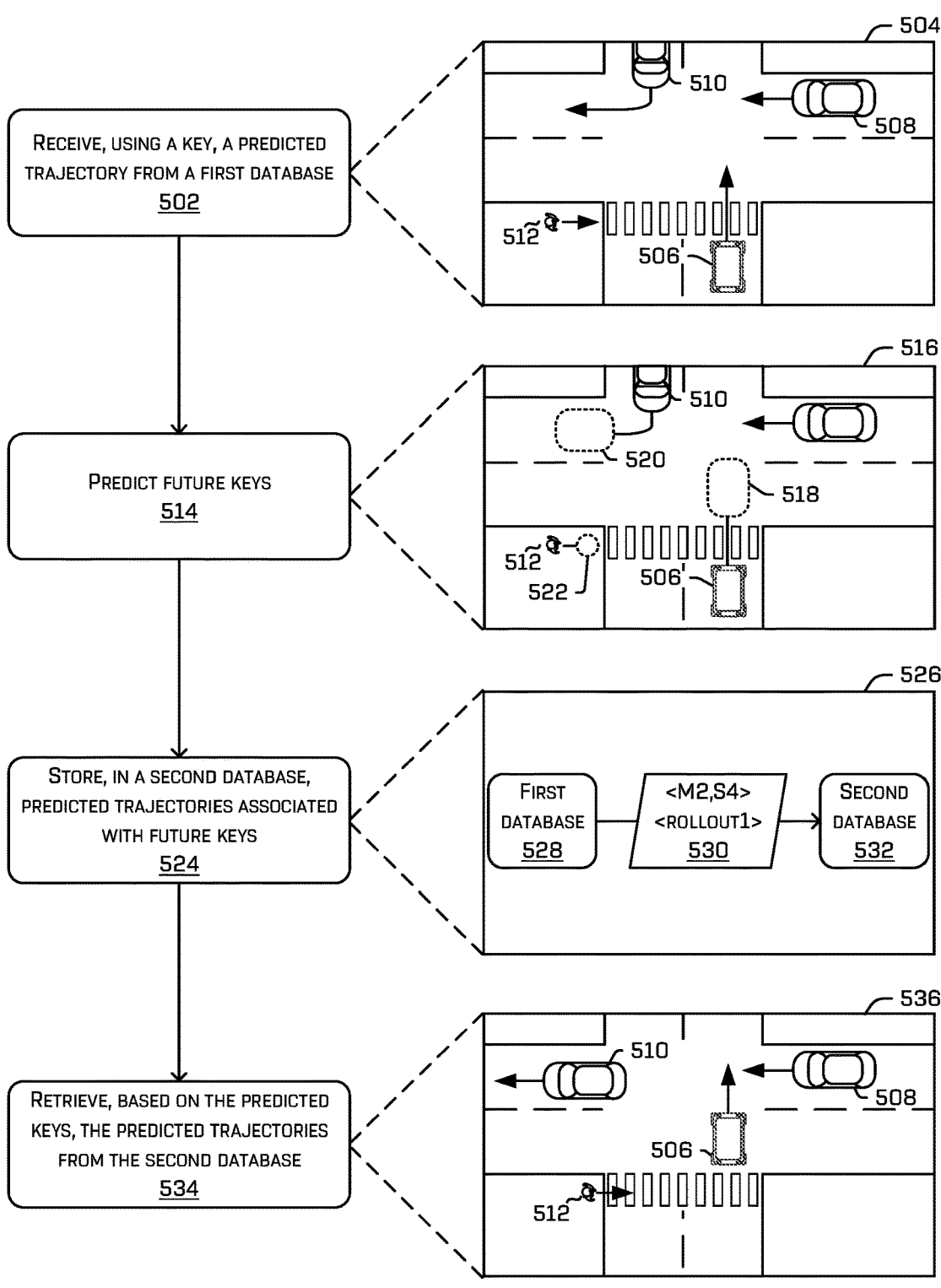
FIG. 5 is a pictorial flow diagram illustrating an example technique for predictively caching driving scenarios from a first database in a second database, in accordance with one or more examples of the disclosure.

FIG. 5 is a pictorial flow diagram illustrating an example process 500 for predictively caching driving scenarios of a first database in a second database. As noted above, predicting and/or storing future key-value pairs in a separate database may reduce computational complexity, thereby reducing latency experienced by the vehicle when retrieving predicted trajectories.

At operation 502, a prediction component may receive, using a key representing a driving scenario, a predicted trajectory from a first database. In some examples, a vehicle may determine a key (e.g., encoded data) representative of the of a driving scenario. In such instances, the vehicle may use the key to determine whether a precomputed database contains a driving scenario similar to that represented by the key. Upon identifying a driving scenario in the first database similar to that represented by the key, the prediction component may receive prediction information (e.g., predicted trajectories) corresponding to the driving scenario. For example, box 504 illustrates an autonomous vehicle 506 navigating an environment and approaching an intersection in the environment. Specifically, box 504 illustrates a plurality of objects with associating predicted trajectories. In this example, the autonomous vehicle 506 may be approaching a junction including an object 508, an object 510, and an object 512. As shown in box 504, the object 508 may be a vehicle, the object 510 may be a vehicle, and the object 512 may be a pedestrian. Of course, in other examples, the environment may include any number of objects, each of which may be any type of dynamic object (e.g., a vehicle, a motorcycle, a bicycle, a pedestrian, an animal, etc.) or static object (e.g., a building, a road surface feature, a tree, a sign, a barrier, a parked vehicle, etc.).

As shown in box 504, the objects may include predicted trajectories. For instance, the object 508 may have a predicted trajectory that predicts that the object 508 may navigate through the intersection, the object 510 may have a predicted trajectory that predicts that the object 510 may turn right upon entering the intersection, and the object 512 may have a predicted trajectory that predicts the object 512 navigates into the intersection via the crosswalk. Of course, in other examples, some or all of the objects may have similar trajectories predicting that the objects navigate in different directions.

At operation 514, the prediction component may predict future keys based on a current and/or predicted state of the vehicle 506. In some examples, the prediction component may determine future states of the vehicle based on a trajectory and/or destination of the vehicle. Accordingly, the prediction component may identify one or more future key-value pairs in the database based on the future states of the vehicle. Future key-value pair(s) may be key-value pairs that the vehicle 506 is predicted to access and/or utilize at a future time. For example, box 516 illustrates the vehicle 506 and objects in addition to a plurality of predicted future states of the vehicle 506 and such objects. In this example, box 516 may include a predicted future state 518, a predicted future state 520, and a predicted future state 522. In some examples, the predicted future state 518 may be a predicted state of the vehicle 506 at a future time, the predicted future state 520 may be a predicted state of the object 510 at a future time, and the predicted future state 522 may be a predicted state of the object 512 at a future time. The prediction component may determine a predicted state for an object based on inputting data associated with the object into one or more machine-learning models trained to output predicted future states.

In some examples, the prediction component may identify key-value pairs in the database based on the predicted future state(s) of the vehicle and/or objects in the driving scenario. That is, the prediction component may identify keys within the database that represent a driving scenario that is sufficiently similar to the predicted future states.

At operation 524, the prediction component may store, in a second database, the prediction trajectories associated with the predicted future key(s). In some examples, a first database 528 may be a primary database determined or otherwise generated during a precomputation state. The second database 532 may be a secondary database updated and/or modified while the vehicle 506 navigates the environment. In some examples, the prediction component may store the key-value pairs (identified at operation 514) in the second database 532. For example, box 526 illustrates encoded data being stored in a second database 532. In this example, the prediction component may identify the encoded data 530 stored in the first database 528 and store the encoded data 530 in the second database 532.

At operation 534, the prediction component may retrieve, based on the predicted keys, the predicted trajectories from the second database. In some examples, when the prediction component attempts to determine predicted trajectories for objects, the prediction component may access the second database 532 to retrieve such prediction information. As shown, the prediction component may retrieve a predicted trajectory for the object 508 that predicts that the object 508 may navigate into the intersection, a predicted trajectory for the object 510 that predicts the object 510 may navigate in a direction away from the intersection, and a predicted trajectory for the object 512 that predicts that the object 512 may navigate into the intersection.

Figure 6:
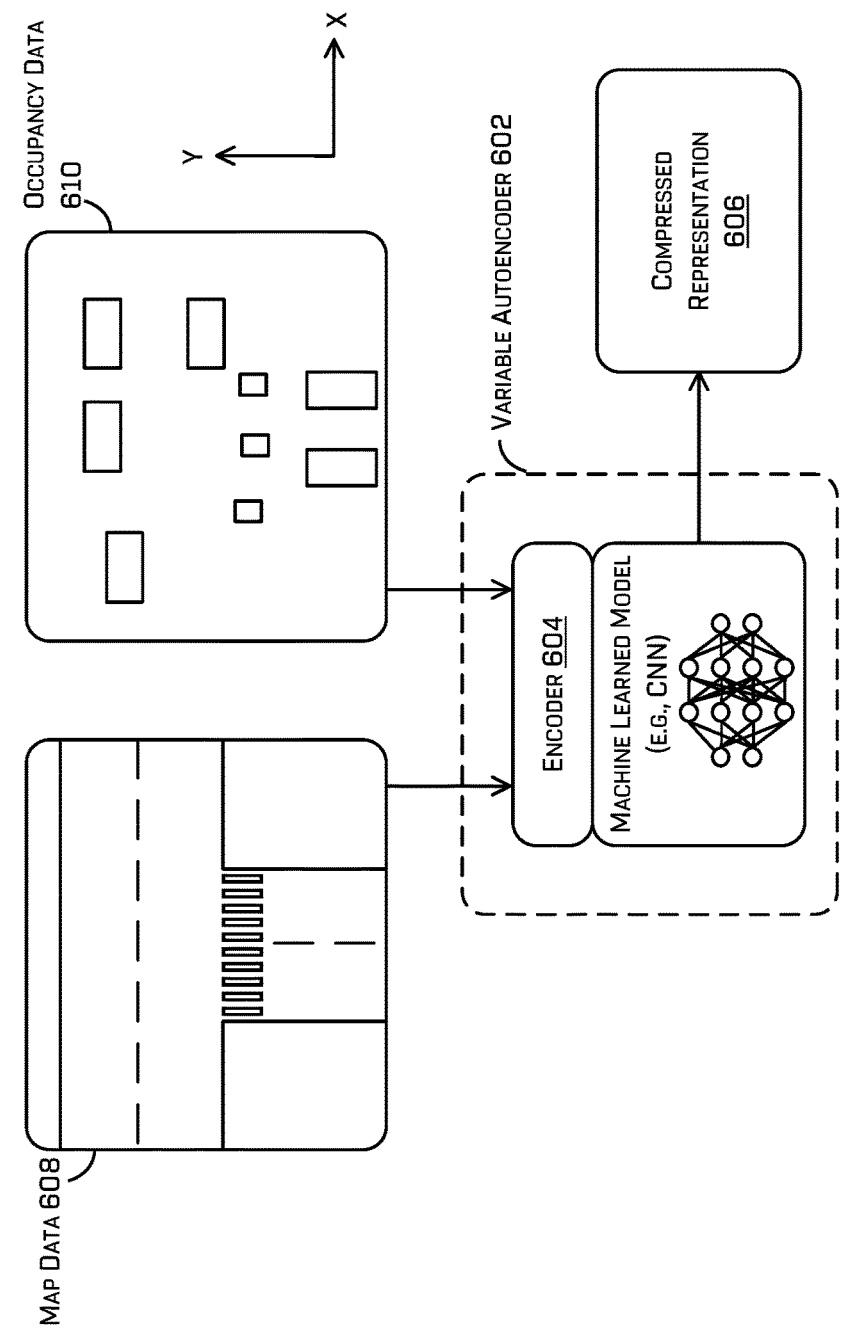
FIG. 6 illustrates an example block diagram of an example variable autoencoder implemented by a computing device to generate example output data, in accordance with one or more examples of the disclosure.

FIG. 6 illustrates an example block diagram 600 of an example variable autoencoder implemented by a computing device to generate example output data, as described herein. The techniques described in the example 600 may be performed by a computing device such as the vehicle computing device(s) 704 and/or the computing device(s) 736. However, this is not intended to be limiting; in other examples, the vehicle computing device(s) 704 may use any other type of encoder.

As depicted in FIG. 6, the variable autoencoder 602 comprising an encoder 604 that can be trained to output object occupancy information (e.g., a bounding box, heatmap), scene data, and/or object attribute information (e.g., an object state, an object type, etc.). For instance, the encoder 604 of the variable autoencoder 602 can receive, as input data, the map data 608 representing an environment and occupancy data 610 (e.g., scene data) associated with one or more objects in the environment. The encoder 604 can output a compressed representation 606 of the input data which represents a latent embedding. In some examples, the compressed representation 606 may be referred to as the encoding.

In some examples, the encoder 604 can represent a machine learned model such as a CNN, a GNN, a GAN, an RNN, a transformer model, and the like. As discussed elsewhere herein, the encoder 604 can be trained based at least in part on the map data 608 and the occupancy data 610. In some examples, the map data 608 and/or the occupancy data 610 can represent a top-down view of the environment (as indicated by the x and y axes). In some examples, the encoder 604 can receive one of the map data 608 and/or the occupancy data 610 as input. For example, the encoder 604 can receive the occupancy data 610 as input and a decoder component can receive a compressed version of the occupancy data 610 as input (not shown).

Figure 7:
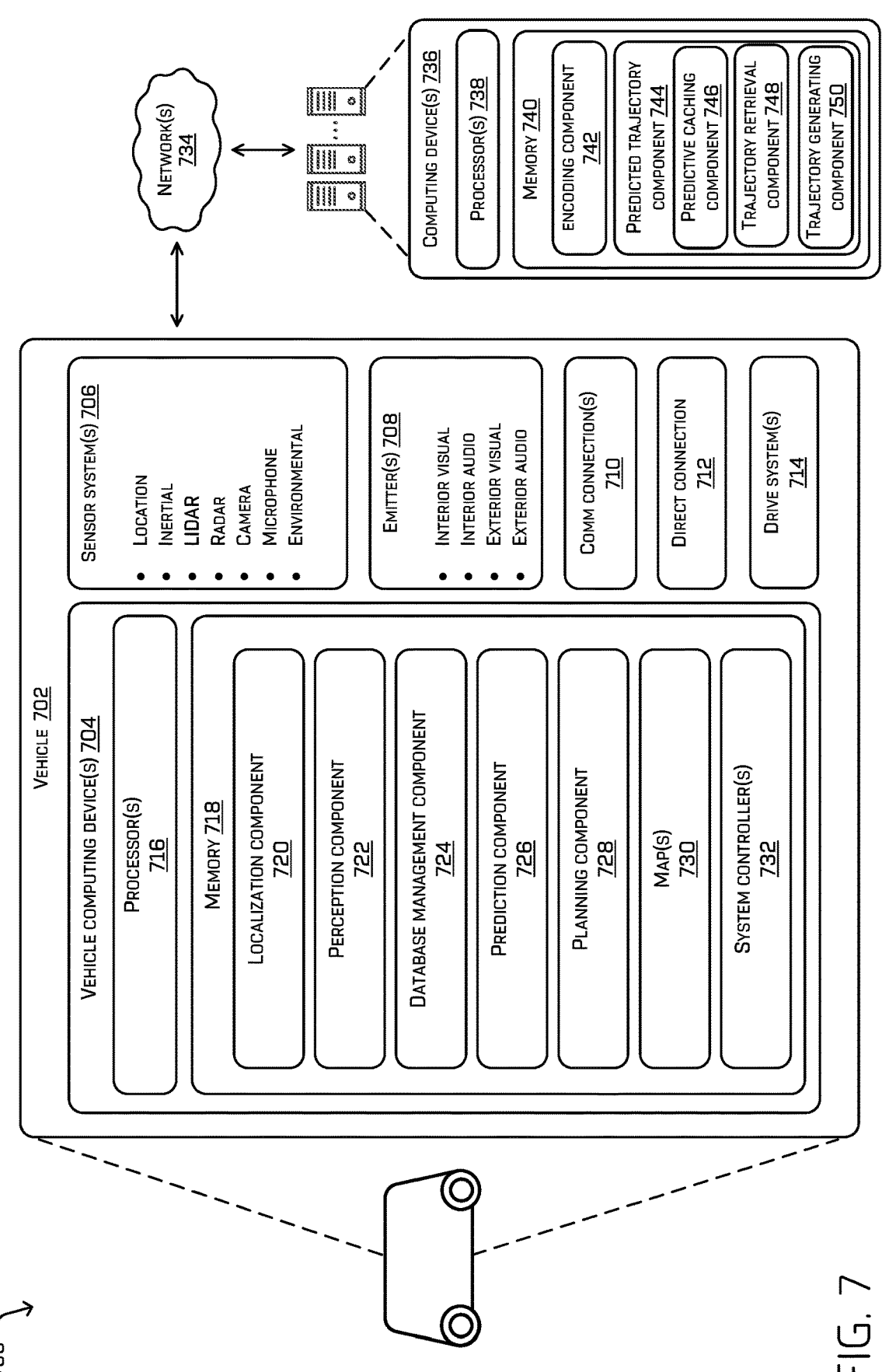
FIG. 7 depicts a block diagram of an example system for implementing various techniques described herein.

FIG. 7 is a block diagram of an example system 700 for implementing the techniques described herein. In at least one example, the system 700 may include a vehicle, such as vehicle 702. The vehicle 702 may include one or more vehicle computing devices 704, one or more sensor systems 706, one or more emitters 708, one or more communication connections 710, at least one direct connection 712, and one or more drive systems 714.

The vehicle computing device 704 may include one or more processors 716 and memory 718 communicatively coupled with the processor(s) 716. In the illustrated example, the vehicle 702 is an autonomous vehicle; however, the vehicle 702 could be any other type of vehicle, such as a semi-autonomous vehicle, or any other system having at least an image capture device (e.g., a camera-enabled smartphone). In some instances, the autonomous vehicle 702 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 702 may be a fully or partially autonomous vehicle having any other level or classification.

In the illustrated example, the memory 718 of the vehicle computing device 704 stores a localization component 720, a perception component 722, a database management component 724, a prediction component 726, a planner component 728, one or more system controllers 732, and one or more maps 730 (or map data). Though depicted in FIG. 6 as residing in the memory 718 for illustrative purposes, it is contemplated that the localization component 720, the perception component 722, the database management component 724, the prediction component 726, the planner component 728, system controller(s) 732, and/or the map(s) may additionally, or alternatively, be accessible to the vehicle 702 (e.g., stored on, or otherwise accessible by, memory remote from the vehicle 702, such as, for example, on memory 740 of one or more computing device 736 (e.g., a remote computing device)). In some examples, the memory 740 may include an encoding component 742 and a predicted trajectory component 744 which may include one or more subcomponents including a predictive caching component 746, a trajectory retrieval component 748, and a trajectory generating component 750.

In at least one example, the localization component 720 may include functionality to receive sensor data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 730, and may continuously determine a location and/or orientation of the vehicle 702 within the environment. In some instances, the localization component 720 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 702. In some instances, the localization component 720 may provide data to various components of the vehicle 702 to determine an initial position of the vehicle 702 for determining the relevance of an object to the vehicle 702, as discussed herein.

In some instances, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 726 may generate one or more probability maps representing prediction probabilities of possible locations of one or more objects in an environment. For example, the prediction component 726 may generate one or more probability maps for vehicles, pedestrians, animals, and the like within a threshold distance from the vehicle 702. In some instances, the prediction component 726 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 726 may generate predicted trajectories of objects (e.g., objects) in an environment. For example, the prediction component 726 may generate one or more predicted trajectories for objects within a threshold distance from the vehicle 702. In some examples, the prediction component 726 may measure a trace of an object and generate a trajectory for the object based on observed and predicted behavior. Additionally, the prediction component 726 may be perform any of the techniques described with respect to any of FIGS. 1-6 above with respect to receiving, retrieving, determining, and/or generating predicted trajectories for object(s) within the environment.

In general, the planner component 728 may determine a path for the vehicle 702 to follow to traverse through an environment. For example, the planner component 728 may determine various routes and trajectories and various levels of detail. For example, the planner component 728 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planner component 728 may generate an instruction for guiding the vehicle 702 along at least a portion of the route from the first location to the second location. In at least one example, the planner component 728 may determine how to guide the vehicle 702 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planner component 728 may select a trajectory for the vehicle 702.

In other examples, the planner component 728 may alternatively, or additionally, use data from the localization component 720, the perception component 722, and/or the prediction component 726 to determine a path for the vehicle 702 to follow to traverse through an environment. For example, the planner component 728 may receive data (e.g., object data) from the localization component 720, the perception component 722, and/or the prediction component 726 regarding objects associated with an environment. In some examples, the planner component 728 receives data for relevant objects within the environment. Using this data, the planner component 728 may determine a route to travel from a first location (e.g., a current location) to a second location (e.g., a target location) to avoid objects in an environment. In at least some examples, such a planner component 728 may determine there is no such collision-free path and, in turn, provide a path that brings vehicle 702 to a safe stop avoiding all collisions and/or otherwise mitigating damage.

The database management component 724 may perform any of the techniques described with respect to any of FIGS. 1-6 above with respect to determining a database (during a pre-computation stage) that contains prediction information accessible to one or more vehicle (or a fleet of vehicles) while such vehicle(s) navigate an environment.

In at least one example, the vehicle computing device 704 may include one or more system controllers 732, which may be configured to control steering, propulsion, braking, safety, emitters, communication, and other systems of the vehicle 702. The system controller(s) 732 may communicate with and/or control corresponding systems of the drive system(s) 714 and/or other components of the vehicle 702.

The memory 718 may further include one or more maps 730 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 730. That is, the map(s) 730 may be used in connection with the localization component 720, the perception component 722, the prediction component 726, and/or the planner component 728 to determine a location of the vehicle 702, detect objects in an environment, generate routes, determine actions and/or trajectories to navigate within an environment.

In some examples, the one or more maps 730 may be stored on a remote computing device(s) (such as the computing device(s) 736) accessible via network(s) 734. In some examples, multiple maps 730 may be stored based on, for example, a characteristic (e.g., type of entity, time of day, day of week, season of the year, etc.). Storing multiple maps 730 may have similar memory requirements, but increase the speed at which data in a map may be accessed.

In some instances, aspects of some or all of the components discussed herein may include any models, techniques, and/or machine-learned techniques. For example, in some instances, the components in the memory 718 (and the memory 740, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device 704. Additionally, or in the alternative, the sensor system(s) 706 may send sensor data, via the one or more networks 734, to the one or more computing device(s) 736 at a particular frequency, after a lapse of a predetermined period of time, in near real-time, etc.

The vehicle 702 may also include one or more emitters 708 for emitting light and/or sound. The emitter(s) 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device 736, other nearby vehicles, etc.) and/or one or more remote sensor system(s) for receiving sensor data. The communications connection(s) 710 also enable the vehicle 702 to communicate with a remote teleoperations computing device or other remote services.

The communications connection(s) 710 may include physical and/or logical interfaces for connecting the vehicle computing device 704 to another computing device or a network, such as network(s) 734. For example, the communications connection(s) 710 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the database management component 724, the prediction component 726, the planner component 728, the one or more system controllers 732, and the one or more maps 730 may process sensor data, as described above, and may send their respective outputs, over the one or more network(s) 734, to the computing device(s) 736. In at least one example, the localization component 720, the perception component 722, the database management component 724, the prediction component 726, the planner component 728, the one or more system controllers 732, and the one or more maps 730 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 734. In some examples, the vehicle 702 may receive sensor data from the computing device(s) 736 and/or remote sensor system(s) via the network(s) 734. The sensor data may include raw sensor data and/or processed sensor data and/or representations of sensor data. In some examples, the sensor data (raw or processed) may be sent and/or received as one or more log files.

The computing device(s) 736 may include processor(s) 738 and a memory 740, which may include an encoding component 742 and a predicted trajectory component 744 which may include one or more subcomponents including a predictive caching component 746, a trajectory retrieval component 748, and a trajectory generating component 750. In some examples, the memory 740 may store one or more of components that are similar to the component(s) stored in the memory 718 of the vehicle 702. In such examples, the computing device(s) 736 may be configured to perform one or more of the processes described herein with respect to the vehicle 702. In some examples, the encoding component 742, the predicted trajectory component 744, the predictive caching component 746, the trajectory retrieval component 748, and the trajectory generating component 750 may perform substantially similar functions as the database management component 724 and/or the prediction component 726.

The processor(s) 716 of the vehicle 702 and the processor(s) 738 of the computing device(s) 736 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and memory 740 are examples of non-transitory computer-readable media. The memory 718 and memory 740 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

FIG. 8 is a flow diagram illustrating an example process 800 of receiving sensor data, determining a subset of similar driving scenarios, and storing the similar driving scenarios in a database. As described below, the example process 800 may be performed by one or more computer computer-based components configured to implement various functionalities described herein. For instance, process 800 may be performed by a database management component 202. As described above, the database management component 202 may be integrated as a separate server-based system. However, in other examples, the database management component 202 may be integrated as an on-vehicle system.

Process 800 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 802, the database management component may receive sensor data including a set of driving scenarios. In some examples, the database management component may receive and/or determine a database during a pre-computation stage. For example, a pre-computation state may be a moment in which the vehicle turns on, initializes, and/or any other situation. In some instances, the database management component may receive, as driving log data for example, data of one or more autonomous vehicles including, for example, sensor data, output of one or more components including prediction components, planning components, actuators, etc, which may be based on previous driving trips within various physical driving environments. Additionally or alternatively, sensor data associated with driving environments may be received from other sources, such as driving simulations and/or non-vehicle based environmental sensors. In some examples, the sensor data may include one or more driving scenarios captured and/or experienced by a vehicle at a previous time. A driving scenario may include the associated map data, vehicle information (e.g., trajectory data (e.g., velocity, acceleration steering angle, etc.), pose data, etc.), object information (e.g., a trajectory of the object(s), a pose of the object(s), a number of object(s), a type of the object(s), a past trajectory of the object(s), etc.) and/or any other information.

At operation 804, the database management component may input the sensor data into a machine-learning model. In some examples, the database management component may use one or more machine-learning models to encode the sensor data. In some examples, the database management component may determine an encoded representation (e.g., <M,S>) based on the sensor data. The encoded data may be a feature vector representation of the map and/or scene data of the driving scenario.

At operation 806, the database management component may receive, from the machine-learning model, a set of encoded representations indicative of the set of driving scenarios. In some instances, the database management component may input the sensor data corresponding to the driving scenarios into a machine-learning model (e.g., auto-encoder) trained to output encoded representations (e.g., vector representation). For instance, the machine-learning model may output an encoded representation (e.g., <M,S>). In some examples, the database management component may determine encoded representations for some or all driving scenarios within the log data.

At operation 808, the database management component may determine clusters of driving scenarios based on the set of encoded representations. That is, the database management component may determine a cluster (e.g., subset) of driving scenarios based on the encoded data (e.g., include similar map and scene features). Such features may include road geometry (e.g., T-intersection, three-way stop, straight road, curved road, etc.), a number of lanes, a type of lane marker (e.g., color of lane (e.g., yellow, white, etc.), dashed lane, solid single lane, solid double lane, etc.), a speed limit, a number of objects, a type of object (e.g., static, dynamic (e.g., vehicle (e.g., small car, semi-truck, etc.), pedestrian, animal, etc.), a feature of the object (e.g., a pose, a trajectory, a velocity, an acceleration, etc.), and/or any other features. In some examples, the database management component may determine whether driving scenarios are similar based on various techniques, such as by using a heuristic-based approach (e.g., cluster driving scenarios together that have similar or identical tags (e.g., provided by human and/or machine-learned taggers at a previous time)), inputting the sensor data into an machine-learning model trained to output clusters of similar driving scenarios, encoding feature vectors based on the sensor data and determining whether a distance between feature vectors of different driving scenarios are within a threshold distance, and/or any other clustering technique. Additional or alternative methods may be used including, k-means, k-medoids, DBSCAN, or otherwise.

At operation 810, the database management component may determine, based on the cluster of driving scenarios, prediction information associated with an object in the cluster. In some instances, prediction information may include a list of the actual trajectories of the objects from some or all the driving scenarios (e.g., <scenarios>) associated with the encoded representation <M,S>. Further, the prediction information may include some or all observed trajectories from some or all of the driving scenarios in the cluster. In other examples, the database management component may determine a limited number of predicted trajectories based on averaging the observed trajectories from the various driving scenarios in the cluster. Alternatively or additionally, the prediction information may include a list of trajectories generated and/or output by one or more machine-learning models.

At operation 812, the database management component may store, in a database, the encoded representation and the prediction information. In some examples, the database management component may determine key-value pairs to store in a database based on the clusters and prediction information. In some instances, the encoded representation of a cluster of driving scenarios may be a key and the prediction information may be a value. The database management component may store the key-value pairs in database. The database may be represented as a lookup table, a tree structure, and/or any other database architecture. In some instances, one or more vehicles may include permissions sufficient to access the database while navigating an environment.

FIG. 9 is a flow diagram illustrating an example process 800 of receiving sensor data, determining encoded data based on the sensor data, determining predicted trajectories based on the encoded data, and controlling the vehicle to follow the predicted trajectory. As described below, the example process 900 may be performed by one or more computer computer-based components configured to implement various functionalities described herein. For instance, process 900 may be performed by a prediction component 204. As described above, the prediction component 204 may be integrated as an on-vehicle system in some examples. However, in other examples, the prediction component 204 may be integrated as a separate server-based system.

Process 900 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 902, the vehicle may receive sensor data associated with an environment. In some examples, the vehicle may include multiple sensor devices (e.g., lidar device(s), radar device(s), time-of-flight device(s), image capturing device(s), etc.) configured to receive sensor data of the environment. Further, each sensor device may provide unique sensor data representative of the perspective of the sensor device.

At operation 904, the vehicle may detect an object based on the sensor data. Specifically, the vehicle may analyze the sensor data to detect and/or classify object(s) within a region of the environment proximate the vehicle. Examples of techniques for performing object detection and/or classification can be found, for example, in U.S. application Ser. No. 17/405,865, filed Aug. 18, 2021, and titled "Determining Object Characteristics Using Unobstructed Sensor Emissions," in U.S. application Ser. No. 16/779,576, filed Jan. 31, 2020, and titled "Object Detection and Tracking," in U.S. patent application Ser. No. 16/587,605, filed Sep. 30, 2019, and titled "Perception System, in U.S. patent application Ser.

No. 16/726,097, filed Dec. 23, 2019, and titled "Pedestrian Object Detection Training," in U.S. patent application Ser. No. 16/797,656, filed Feb. 21, 2020, and titled "Combined Track Confidence And Classification Model," and in U.S. patent application Ser. No. 16/457,524, filed Jun. 28, 2019, and titled "Head Detection For Improved Pedestrian Detection, each of which is incorporated by reference herein, in its entirety for all purposes.

At operation 906, the vehicle may input sensor data into a machine-learning model. In some examples, the vehicle may determine an encoded representation (e.g., <M,S>) based on the sensor data captured by the vehicle. The vehicle may determine a single encoded representation <M,S> representative of the current sensor data; however, in other examples, the prediction component may determine a map encoded representation (e.g., <M>) representative of the map data and/or vehicle location data as well as a scene encoded representation (e.g., <S>) representative of the object(s) and/or object(s) feature(s). Accordingly, the prediction component may input the sensor data and/or map data into one or more machine-learning models trained to output one or more keys representing the current driving scenario of the vehicle. The prediction component may use the same or different machine-learning model to generate the one or more encoded representations. Techniques for generating an encoded representation of the sensor data and/or embedded vector representation of such sensor data may be found, for example, in U.S. patent application Ser. No. 18/087,570 entitled "Generating Object Representations Using a Variable Autoencoder" filed on Dec. 22, 2022, the entire contents of which are hereby incorporated by reference herein for all purposes.

At operation 908, the vehicle may receive, from the machine-learning model, an encoded representation of the object(s) and the map data of the vehicle. As described above, the vehicle may receive an encoded representation of the of the current sensor data. In such instances, the key or encoded representation may be a feature vector. In some examples, the encoded representation may include a map data portion that represents an encoded version of the physical environment within which the vehicle is located. Further, the encoded representation may include encoded versions of scene elements such as object(s), object type(s), object location(s), pose of object(s), kinematic information of object(s), etc.

At operation 910, the vehicle may access, based on the encoded representation, a database including a plurality of predicted driving scenarios. In some examples, a database management component may generate a database containing prediction information organized by driving scenarios. In such instances, the database management component may transmit the database to the vehicle such that the vehicle is able to access the database while navigating an environment. The database may be organized by key-value pairs with the key being an encoded representation of a driving scenario and the value being prediction information associated with the driving scenario. As such, the vehicle may use the current encoded representation to access the database.

At operation 912, the vehicle may determine whether the current encoded representation is sufficiently similar to one or more encoded representations in the database. As such, the vehicle may compare a value of the current encoded representation to a value of the encoded representation(s) in the database. Further, the prediction component may determine whether the encoded representations (e.g., keys) are sufficiently similar by comparing the result of comparison to a threshold value. For example, the prediction component may determine a distance between the current encoded representation <M,S> and an encoded representation <M₁, S₁> in the database. If the distance is below a threshold value, the prediction component may determine that the encoded representations, and consequently the driving scenarios, are sufficiently similar. In contrast, if the distance meets or exceeds a threshold value, the prediction component may determine that the encoded representations, and consequently the driving scenarios, are not sufficiently similar. As such, if the vehicle determines that the current encoded representation is not similar to encoded representations in the database (912: No), the vehicle may determine that the database does not include a driving scenario similar to that which the vehicle is currently experiencing. At operation 914, the vehicle may generate a predicted trajectory to associate with the object. Based on the database not having a similar driving scenario, the vehicle may generate (on-vehicle) one or more predicted trajectories to associate with the objects. In such situations, the vehicle may send the predicted trajectories to prediction and/or planning components which may evaluate the trajectories when determining a path for the vehicle to follow.

In contrast, if the vehicle determines that the encoded representation is similar to one or more encoded representations in the database (912: Yes), the vehicle may retrieve predicted trajectories from the database. That is, at operation 916, the vehicle may retrieve predicted trajectories from the database. In such instances, the vehicle can retrieve the predicted trajectories and send such trajectories to prediction and/or planning components of the vehicle for further processing.

In some examples, the vehicle may control the vehicle based on the predicted trajectory associated with the object. The vehicle may analyze and/or evaluate the predicted trajectories generated at operation 914 and/or retrieved at operation 916. In such instances, the vehicle may use the predicted trajectories to represent how the object may move at future times. Accordingly, the vehicle may determine a trajectory to follow through the environment based on the predicted trajectories of the object.

EXAMPLE CLAUSES

A: A system comprising: one or more processors; and one or more non-transitory computer-readable media storing computer-executable instructions that, when executed, cause the one or more processors to perform operations comprising: receiving data associated with an environment, wherein the data is representative of a set of driving scenarios; inputting the data into a machine-learning model; receiving, from the machine-learning model, a set of encoded data representative of the set of driving scenarios; determining, based at least in part on the set of encoded data, a cluster of driving scenarios of the set of driving scenarios; determining, based at least in part on the cluster of driving scenarios, prediction information associated with an object in the cluster of driving scenarios; storing, in a database, the cluster and the prediction information; and transmitting the database to an autonomous vehicle configured to be controlled based at least in part on the database.

B: The system of paragraph A, wherein the cluster includes a key, the key being determined based at least in part on determining an average value of the cluster.

C: The system of paragraph A, wherein a driving scenario is based at least in part on at least one of: a road geometry associated with set of driving scenarios, a first number of lanes associated with set of driving scenarios, a first type of lane associated with set of driving scenarios, a speed limit associated with set of driving scenarios, a second number of objects associated with set of driving scenarios, a second type of object associated with set of driving scenarios, environmental data associated with the set of driving scenarios, or a feature of an object associated with set of driving scenarios.

D: The system of paragraph A, wherein the prediction information comprises at least one of: a previously observed trajectory of the object, a trajectory generated based at least in part on the data, or a reference to a second cluster.

E: The system of paragraph D, wherein the trajectory is generated based at least in part on: inputting the set of driving scenarios into a machine-learning model; receiving, from the machine-learned model, a set of predicted states of the environment; and determining, based at least in part on the set of predicted states, the trajectory.

F: One or more non-transitory computer-readable media storing instructions executable by one or more processors, wherein the instructions, when executed, cause the one or more processors to perform operations comprising: receiving data representative with a set of driving scenarios; determining a representative scenario of the set of driving scenarios; determining a prediction associated with the representative scenario; storing, in a database, an association between the representative scenario and the prediction; and transmitting, to an autonomous vehicle, the database, the autonomous vehicle configured to be controlled based at least in part on the database.

G: The one or more non-transitory computer-readable media of paragraph F, wherein determining the representative scenario comprises: inputting the set of driving scenarios into a machine learned model; and receiving, from the machine learned model, a set of encodings, an encoding of the set of encodings representative of a driving scenario of the set of driving scenarios.

H: The one or more non-transitory computer-readable media of paragraph G, wherein determining the representative scenario further comprises: clustering the set of encodings into a plurality of clusters; and determining, based at least in part on a subset of encodings associated with a cluster of the plurality of clusters, the representative scenario.

I: The one or more non-transitory computer-readable media of paragraph H, wherein a cluster of the plurality of clusters includes a key, the key being determined based at least in part on determining an average value of the cluster.

J: The one or more non-transitory computer-readable media of paragraph H, wherein determining the representative scenario is based at least in part on determining an average of two or more trajectories associated with a cluster of the plurality of clusters.

K: The one or more non-transitory computer-readable media of paragraph F, wherein the set of driving scenarios are defined based at least in part on one or more of: a road geometry associated with set of driving scenarios, a first number of lanes associated with set of driving scenarios, a first type of lane associated with set of driving scenarios, a speed limit associated with set of driving scenarios, a second number of objects associated with set of driving scenarios, a second type of object associated with set of driving scenarios, environmental data associated with the set of driving scenarios or a feature of an object associated with set of driving scenarios.

L: The one or more non-transitory computer-readable media of paragraph F, wherein the prediction comprises at least one of: a previously observed trajectory of an object associated with the representative scenario, a trajectory generated based at least in part on the data, or a reference to a second cluster.

M: The one or more non-transitory computer-readable media of paragraph L, wherein the trajectory is generated based at least in part on: inputting the set of driving scenarios into a machine-learning model; receiving, from the machine-learned model, a set of predicted states of an environment; and determining, based at least in part on the set of predicted states, the trajectory.

N: A method comprising: receiving data representative with a set of driving scenarios; determining a representative scenario of the set of driving scenarios; determining a prediction associated with the representative scenario; storing, in a database, an association between the representative scenario and the prediction; and transmitting, to an autonomous vehicle, the database, the autonomous vehicle configured to be controlled based at least in part on the database.

O: The method of paragraph N, wherein determining the representative scenario comprises: inputting the set of driving scenarios into a machine learned model; and receiving, from the machine learned model, a set of encodings, an encoding of the set of encodings representative of a driving scenario of the set of driving scenarios.

P: The method of paragraph O, wherein determining the representative scenario further comprises: clustering the set of encodings into a plurality of clusters; and determining, based at least in part on a subset of encodings associated with a cluster of the plurality of clusters, the representative scenario.

Q: The method of paragraph P, wherein a cluster of the plurality of clusters includes a key, the key being determined based at least in part on determining an average value of the cluster.

R: The method of paragraph P, wherein determining the representative scenario is based at least in part on determining an average of two or more trajectories associated with a cluster of the plurality of clusters.

S: The method of paragraph N, wherein the set of driving scenarios are defined based at least in part on one or more of: a road geometry associated with set of driving scenarios, a first number of lanes associated with set of driving scenarios, a first type of lane associated with set of driving scenarios, a speed limit associated with set of driving scenarios, a second number of objects associated with set of driving scenarios, a second type of object associated with set of driving scenarios, environmental data associated with the set of driving scenarios or a feature of an object associated with set of driving scenarios.

T: The method of paragraph N, wherein the prediction comprises at least one of: a previously observed trajectory of an object associated with the representative scenario, a trajectory generated based at least in part on the data, or a reference to a second cluster.

U: A system comprising: one or more processors; and one or more non-transitory computer-readable media storing computer-executable instructions that, when executed, cause the one or more processors to perform operations comprising: receiving, from a sensor associated with an autonomous vehicle, sensor data associated with an environment; detecting, based at least in part on the sensor data, an object in the environment; determining a relevancy score associated with the object; inputting, based at least in part on the relevancy score, the sensor data into a machine-learning model; receiving, from the machine-learning model, an encoded representation of the object and map data associated with the autonomous vehicle; accessing, based at least in part on the encoded representation, a database including a plurality of predicted driving scenarios; determining, based at least in part on accessing the database, a predicted trajectory associated with the object; and controlling the autonomous vehicle, based at least in part on the predicted trajectory.

V: The system of paragraph U, wherein the encoded representation is a first encoded representation, and wherein determining the predicted trajectory associated with the object comprises: determining that the first encoded representation is associated with a second encoded representation of the database; and receiving, based at least in part on the first encoded representation being associated with the second encoded representation, the predicted trajectory that is associated with the second encoded representation.

W: The system of paragraph U, wherein the sensor data is first sensor data and is captured at a first time, and wherein the predicted trajectory is generated based at least in part on second sensor data that is captured prior to the first time.

X: The system of paragraph U, wherein the predicted trajectory is determined based at least in part on interpolating between a plurality of predicted trajectories in the database.

Y: The system of paragraph U, wherein the relevancy score is based at least in part on at least one of: a distance of the object to the autonomous vehicle, a location of the object relative to a trajectory of the autonomous vehicle, or a type of object.

Z: One or more non-transitory computer-readable media storing instructions executable by one or more processors, wherein the instructions, when executed, cause the one or more processors to perform operations comprising: receiving, from a sensor associated with a vehicle, sensor data associated with an environment; determining, based at least in part on the sensor data, an object in the environment; determining, based at least in part on the sensor data, a key; querying, based at least in part on the key, a database; and determining, based at least in part on a response to the query, a predicted trajectory associated with the object.

AA: The one or more non-transitory computer-readable media of paragraph Z, wherein the key is a first key, and wherein determining the predicted trajectory associated with the object comprises: determining that the first key is associated with a second key of the database; and receiving, based at least in part on the first key being associated with the second key, the predicted trajectory that is associated with the second key.

AB: The one or more non-transitory computer-readable media of paragraph Z, wherein the predicted trajectory comprises two or more predicted trajectories.

AC: The one or more non-transitory computer-readable media of paragraph Z, wherein the sensor data is first sensor data and is captured at a first time, and wherein the predicted trajectory is generated based at least in part on second sensor data that is captured at a second time, wherein the second time is before the first time.

AD: The one or more non-transitory computer-readable media of paragraph Z, wherein determining the key is based at least in part on: inputting the sensor data into a machine-learning model; and receiving, from the machine-learning model, an encoded representation of the object and map data associated with the vehicle.

AE: The one or more non-transitory computer-readable media of paragraph AD, wherein determining the key is based at least in part on: determining, based at least in part on a trajectory of the vehicle, that a relevancy score associated with the object meets or exceeds a threshold level of relevance.

AF: The one or more non-transitory computer-readable media of paragraph Z, wherein the key is a first key, and wherein the database is a first database, the operations further comprising: determining, based at least in part on the first key, a predicted key; accessing, based at least in part on the predicted key, the first database; and storing, in a second database and based at least in part on accessing the first database, a second predicted trajectory associated with the predicted key.

AG: The one or more non-transitory computer-readable media of paragraph Z, wherein determining the key is based at least in part on: determining, based at least in part on a trajectory of the vehicle, that a relevancy score associated with the object is less than a threshold level of relevance; inputting, based at least in part on the relevancy score being below the threshold level, the sensor data into a machine-learning model; and receiving, from the machine-learning model, the key.

AH: The one or more non-transitory computer-readable media of paragraph Z, the operations further comprising: controlling a vehicle based at least in part on the predicted trajectory.

AI: The one or more non-transitory computer-readable media of paragraph Z, querying the database comprises: determining two or more keys within a threshold distance of the key; and determining an interpolation of the two or more keys to determine the predicted trajectory.

AJ: A method comprising: receiving, from a sensor associated with a vehicle, sensor data associated with an environment; determining, based at least in part on the sensor data, an object in the environment; determining, based at least in part on the sensor data, a key; querying, based at least in part on the key, a database; and determining, based at least in part on a response to the query, a predicted trajectory associated with the object.

AK: The method of paragraph AJ, wherein the key is a first key, and wherein determining the predicted trajectory associated with the object comprises: determining that the first key is associated with a second key of the database; and receiving, based at least in part on the first key being associated with the second key, the predicted trajectory that is associated with the second key.

AL: The method of paragraph AJ, wherein the sensor data is first sensor data and is captured at a first time, and wherein the predicted trajectory is generated based at least in part on second sensor data that is captured at a second time, wherein the second time is before the first time.

AM: The method of paragraph AJ, wherein determining the key is based at least in part on: inputting the sensor data into a machine-learning model; and receiving, from the machine-learning model, an encoded representation of the object and map data associated with the vehicle.

AN: The method of paragraph AJ, wherein the key is a first key, and wherein the database is a first database, further comprising: determining, based at least in part on the first key, a predicted key; accessing, based at least in part on the predicted key, the first database; and storing, in a second database and based at least in part on accessing the first database, a second predicted trajectory associated with the predicted key.

While the example clauses described above are described with respect to particular implementations, it should be understood that, in the context of this document, the content of the example clauses can be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the one or more processors to perform operations comprising:
receiving log data associated with an environment, wherein the log data is representative of a set of driving scenarios that were experienced at a previous time;
inputting the log data into a machine-learning model;
receiving, from the machine-learning model, a set of encoded data representative of the set of driving scenarios;
determining, based at least in part on the set of encoded data, a cluster of encoded data of the set of encoded data representative of driving scenarios of the set of driving scenarios;
determining, based at least in part on the cluster of encoded data associated with the driving scenarios, prediction information associated with an object in the cluster of the encoded data associated with the driving scenarios;
storing, in a database, the cluster and the prediction information; and
transmitting the database to an autonomous vehicle configured to be controlled based at least in part on the database.

2. The system of claim 1, wherein the cluster includes a key, the key being determined based at least in part on determining an average value of the cluster.

3. The system of claim 1, wherein a driving scenario is based at least in part on at least one of:
a road geometry associated with the set of driving scenarios,
a first number of lanes associated with the set of driving scenarios,
a first type of lane associated with the set of driving scenarios,
a speed limit associated with the set of driving scenarios,
a second number of objects associated with the set of driving scenarios,
a second type of object associated with the set of driving scenarios,
environmental data associated with the set of driving scenarios, or
a feature of an object associated with the set of driving scenarios.

4. The system of claim 1, wherein the prediction information comprises at least one of:
a previously observed trajectory of the object,
a trajectory generated based at least in part on the log data, or
a reference to a second cluster.

5. The system of claim 4, wherein the trajectory is generated based at least in part on:

inputting the set of driving scenarios into a machine-learned model;

receiving, from the machine-learned model, a set of predicted states of the environment; and determining, based at least in part on the set of predicted states, the trajectory.

6. One or more non transitory computer readable media storing instructions executable by one or more processors, wherein the instructions, when executed, cause the one or more processors to perform operations comprising:

receiving log data representative of a set of driving scenarios that were experienced at a previous time;

determining, based at least in part on the log data, a set of encoded data representative of the set of driving scenarios;

determining a cluster of encoded data of the set of encoded data representative of driving scenarios of the set of driving scenarios;

determining, based at least in part on the cluster, a representative scenario of the set of driving scenarios;

determining a prediction associated with the representative scenario;

storing, in a database, an association between the representative scenario and the prediction; and transmitting, to an autonomous vehicle, the database, the autonomous vehicle configured to be controlled based at least in part on the database.

7. The one or more non transitory computer readable media of claim 6, wherein determining the set of encoded data comprises:

inputting the set of driving scenarios into a machine learned model; and receiving, from the machine learned model, a set of encodings, an encoding of the set of encodings representative of a driving scenario of the set of driving scenarios.

8. The one or more non transitory computer readable media of claim 7, wherein determining the representative scenario further comprises:

clustering the set of encodings into a plurality of clusters; and determining, based at least in part on a subset of encodings associated with the cluster of the plurality of clusters, the representative scenario.

9. The one or more non transitory computer readable media of claim 8, wherein the cluster of the plurality of clusters includes a key, the key being determined based at least in part on determining an average value of the cluster.

10. The one or more non transitory computer readable media of claim 8, wherein determining the representative scenario is based at least in part on determining an average of two or more trajectories associated with the cluster of the plurality of clusters.

11. The one or more non transitory computer readable media of claim 6, wherein the set of driving scenarios are defined based at least in part on one or more of:

a road geometry associated with the set of driving scenarios, a first number of lanes associated with the set of driving scenarios, a first type of lane associated with the set of driving scenarios, a speed limit associated with the set of driving scenarios, a second number of objects associated with the set of driving scenarios, a second type of object associated with the set of driving scenarios, environmental data associated with the set of driving scenarios, or a feature of an object associated with the set of driving scenarios.

12. The one or more non transitory computer readable media of claim 6, wherein the prediction comprises at least one of:

a previously observed trajectory of an object associated with the representative scenario, a trajectory generated based at least in part on the log data, or a reference to a second cluster.

13. The one or more non transitory computer readable media of claim 12, wherein the trajectory is generated based at least in part on:

inputting the set of driving scenarios into a machine-learned model;

receiving, from the machine-learned model, a set of predicted states of an environment; and determining, based at least in part on the set of predicted states, the trajectory.

14. A method comprising:

receiving log data representative of a set of driving scenarios that were experienced at a previous time;

determining, based at least in part on the log data, a set of encoded data representative of the set of driving scenarios;

determining a cluster of encoded data of the set of encoded data representative of driving scenarios of the set of driving scenarios;

determining, based at least in part on the cluster, a representative scenario of the set of driving scenarios;

determining a prediction associated with the representative scenario;

storing, in a database, an association between the representative scenario and the prediction; and transmitting, to an autonomous vehicle, the database, the autonomous vehicle configured to be controlled based at least in part on the database.

15. The method of claim 14, wherein determining the set of encoded data comprises:

inputting the set of driving scenarios into a machine learned model; and receiving, from the machine learned model, a set of encodings, an encoding of the set of encodings representative of a driving scenario of the set of driving scenarios.

16. The method of claim 15, wherein determining the representative scenario further comprises:

clustering the set of encodings into a plurality of clusters; and determining, based at least in part on a subset of encodings associated with the cluster of the plurality of clusters, the representative scenario.

17. The method of claim 16, wherein the cluster of the plurality of clusters includes a key, the key being determined based at least in part on determining an average value of the cluster.

18. The method of claim 16, wherein determining the representative scenario is based at least in part on determining an average of two or more trajectories associated with the cluster of the plurality of clusters.

19. The method of claim 14, wherein the set of driving scenarios are defined based at least in part on one or more of:

a road geometry associated with the set of driving scenarios, a first number of lanes associated with the set of driving scenarios, a first type of lane associated with the set of driving scenarios, a speed limit associated with the set of driving scenarios, a second number of objects associated with the set of driving scenarios, a second type of object associated with the set of driving scenarios, environmental data associated with the set of driving scenarios, or a feature of an object associated with the set of driving scenarios.

20. The method of claim 14, wherein the prediction comprises at least one of:

a previously observed trajectory of an object associated with the representative scenario, a trajectory generated based at least in part on the log data, or a reference to a second cluster.

\* \* \* \* \*